US012359591B1

(12) United States Patent
O'Donnell et al.

(10) Patent No.: US 12,359,591 B1
(45) Date of Patent: Jul. 15, 2025

(54) THERMAL ENERGY STORAGE SYSTEMS FOR REPOWERING EXISTING POWER PLANTS FOR IMPROVING EFFICIENCY AND SAFETY

(71) Applicant: Rondo Energy, Inc., Alameda, CA (US)

(72) Inventors: John Setel O'Donnell, Oakland, CA (US); Carlos Alberto Ceballos Castillo, Medellin (CO)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 18/518,383

(22) Filed: Nov. 22, 2023

Related U.S. Application Data

(63) Continuation-in-part of application No. 18/106,428, filed on Feb. 6, 2023, now Pat. No. 11,859,518, which
(Continued)

(51) Int. Cl.
*F01K 3/02* (2006.01)
*B63H 11/00* (2006.01)
(Continued)

(52) U.S. Cl.
CPC ............. *F01K 3/02* (2013.01); *B63H 11/00* (2013.01); *F01K 3/08* (2013.01); *F01K 3/186* (2013.01);
(Continued)

(58) Field of Classification Search
CPC ... F01K 3/02; F01K 3/08; F01K 3/186; F01K 13/02; F01K 15/00; F01K 11/02;
(Continued)

(56) References Cited

U.S. PATENT DOCUMENTS

| 1,089,951 A | 3/1914 | Otto |
| 1,700,542 A | 1/1929 | O'Donnell |

(Continued)

FOREIGN PATENT DOCUMENTS

| AU | 2012292959 B2 | 2/2016 |
| AU | 2016100264 A4 | 4/2016 |

(Continued)

OTHER PUBLICATIONS

International Search Report and Written Opinion mailed on Mar. 1, 2024 for International Application No. PCT/US2023/034488, 14 pages.

(Continued)

*Primary Examiner* — Shafiq Mian
(74) *Attorney, Agent, or Firm* — Procopio, Cory, Hargreaves & Savitch; Matt Rainey

(57) ABSTRACT

An energy storage system (TES) converts variable renewable electricity (VRE) to continuous heat at over 1000° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. In one application, there are thermal energy storage units that provide existing power plants with greater system efficiency, safety, and reduced fuel consumption.

20 Claims, 27 Drawing Sheets

Related U.S. Application Data is a continuation of application No. 17/668,342, filed on Feb. 9, 2022, now Pat. No. 11,572,811, which is a continuation of application No. 17/537,407, filed on Nov. 29, 2021, now Pat. No. 11,603,776.

(60) Provisional application No. 63/578,139, filed on Aug. 22, 2023, provisional application No. 63/459,540, filed on Apr. 14, 2023, provisional application No. 63/434,919, filed on Dec. 22, 2022, provisional application No. 63/427,374, filed on Nov. 22, 2022, provisional application No. 63/231,155, filed on Aug. 9, 2021, provisional application No. 63/170,370, filed on Apr. 2, 2021, provisional application No. 63/165,632, filed on Mar. 24, 2021, provisional application No. 63/155,261, filed on Mar. 1, 2021, provisional application No. 63/119,443, filed on Nov. 30, 2020.

(51) Int. Cl.

| | | |
|---|---|---|
| *F01K 3/08* | (2006.01) | |
| *F01K 3/18* | (2006.01) | |
| *F01K 13/02* | (2006.01) | |
| *F01K 15/00* | (2006.01) | |
| *F03G 6/00* | (2006.01) | |
| *F22B 29/06* | (2006.01) | |
| *F22B 35/10* | (2006.01) | |
| *F28D 20/00* | (2006.01) | |
| *H01M 8/04007* | (2016.01) | |
| *H01M 8/04014* | (2016.01) | |
| *H01M 8/04029* | (2016.01) | |
| *H02J 1/10* | (2006.01) | |
| *H02J 3/00* | (2006.01) | |
| *H02J 3/04* | (2006.01) | |
| *H02M 1/00* | (2006.01) | |
| *B63H 1/12* | (2006.01) | |
| *B63H 11/12* | (2006.01) | |
| *B63H 11/14* | (2006.01) | |
| *B63H 11/16* | (2006.01) | |
| *F01K 11/02* | (2006.01) | |
| *F01K 19/04* | (2006.01) | |
| *F03D 9/18* | (2016.01) | |

(52) U.S. Cl.
CPC .............. *F01K 13/02* (2013.01); *F01K 15/00* (2013.01); *F03G 6/071* (2021.08); *F22B 29/06* (2013.01); *F22B 35/10* (2013.01); *F28D 20/00* (2013.01); *H01M 8/04014* (2013.01); *H01M 8/04029* (2013.01); *H01M 8/04037* (2013.01); *H01M 8/04052* (2013.01); *H01M 8/04074* (2013.01); *H02J 1/102* (2013.01); *H02J 3/00* (2013.01); *H02J 3/04* (2013.01); *H02M 1/0003* (2021.05); *H02M 1/007* (2021.05); *B63H 1/12* (2013.01); *B63H 11/12* (2013.01); *B63H 11/14* (2013.01); *B63H 11/16* (2013.01); *F01K 11/02* (2013.01); *F01K 19/04* (2013.01); *F03D 9/18* (2016.05); *F28D 2020/0004* (2013.01); *Y02E 60/14* (2013.01)

(58) Field of Classification Search
CPC ..... F01K 19/04; H02M 1/007; H02M 1/0003; F03G 6/071; B63H 11/00; B63H 1/12; B63H 11/12; B63H 11/14; B63H 11/01; F22B 29/06; F22B 35/10; F28D 20/00; F28D 2020/0004; H01M 8/04014; H01M 8/04029; H01M 8/04037; H01M 8/04052; H01M 8/04074; H02J 1/102; H02J 3/00; H02J 3/04; F03D 9/18; Y02E 60/14

See application file for complete search history.

(56) References Cited

U.S. PATENT DOCUMENTS

| | | | |
|---|---|---|---|
| 1,700,642 A * | 1/1929 | Meindersma | E21B 47/10 |
| | | | 73/152.35 |
| 2,833,532 A | 5/1958 | Ries | |
| 3,381,113 A | 4/1968 | Jacques et al. | |
| 3,549,136 A | 12/1970 | Baab et al. | |
| 3,788,066 A | 1/1974 | Nebgen | |
| 3,908,381 A | 9/1975 | Barber et al. | |
| 3,995,434 A | 12/1976 | Kato et al. | |
| 4,110,987 A | 9/1978 | Cahn et al. | |
| 4,124,061 A | 11/1978 | Mitchell et al. | |
| 4,127,161 A | 11/1978 | Clyne et al. | |
| 4,146,057 A | 3/1979 | Friedman et al. | |
| 4,172,442 A | 10/1979 | Boblitz | |
| 4,200,783 A | 4/1980 | Ehret | |
| 4,222,365 A | 9/1980 | Thomson | |
| 4,234,782 A | 11/1980 | Barabas et al. | |
| 4,237,692 A | 12/1980 | Ahrens et al. | |
| 4,312,324 A | 1/1982 | Ross et al. | |
| 4,329,592 A * | 5/1982 | Wagner | F01K 23/101 |
| | | | 290/40 R |
| 4,397,962 A | 8/1983 | Schockmel | |
| 4,438,630 A | 3/1984 | Rowe | |
| 4,524,756 A | 6/1985 | Laverman | |
| 4,651,810 A | 3/1987 | Triessnig | |
| 4,809,523 A | 3/1989 | Vandenberg | |
| 4,874,034 A | 10/1989 | Hirata et al. | |
| 5,154,224 A | 10/1992 | Yasui et al. | |
| 5,286,472 A | 2/1994 | Fulford | |
| 5,384,489 A * | 1/1995 | Bellac | F03D 9/18 |
| | | | 60/659 |
| 5,416,416 A | 5/1995 | Bisher | |
| 5,419,388 A | 5/1995 | Hickel et al. | |
| 5,553,604 A | 9/1996 | Frei | |
| 5,634,313 A | 6/1997 | Mögling | |
| 5,924,477 A | 7/1999 | Doru | |
| 6,274,855 B1 | 8/2001 | Tatematsu et al. | |
| 6,302,188 B1 | 10/2001 | Ruhl et al. | |
| 6,322,356 B1 | 11/2001 | Gupta et al. | |
| 6,631,754 B1 | 10/2003 | Bremont et al. | |
| 7,213,409 B1 | 5/2007 | Nuckols | |
| 7,693,402 B2 | 4/2010 | Hudson et al. | |
| 8,226,917 B2 | 7/2012 | Fan et al. | |
| 8,544,275 B2 | 10/2013 | Shinnar | |
| 8,701,773 B2 | 4/2014 | O'Donnell et al. | |
| 8,960,182 B2 | 2/2015 | Magaldi et al. | |
| 9,370,044 B2 | 6/2016 | McDonald | |
| 9,512,826 B2 | 12/2016 | Rodionov et al. | |
| 9,556,708 B2 | 1/2017 | Schneider et al. | |
| 9,816,490 B2 | 11/2017 | Conlon | |
| 9,816,491 B2 | 11/2017 | Perry | |
| 9,948,140 B2 | 4/2018 | Pietsch et al. | |
| 9,989,271 B1 | 6/2018 | Becker | |
| 10,113,535 B2 | 10/2018 | Conlon | |
| 10,345,050 B2 | 7/2019 | Pietsch et al. | |
| 10,767,935 B2 | 9/2020 | Bergan et al. | |
| 10,775,111 B2 | 9/2020 | Kerth | |
| 10,876,521 B2 | 12/2020 | Anderson et al. | |
| 11,352,951 B2 | 6/2022 | Apte et al. | |
| 11,459,944 B2 | 10/2022 | Robinson | |
| 11,480,160 B1 | 10/2022 | Mokheimer et al. | |
| 11,809,153 B1 | 11/2023 | Kearns et al. | |
| 11,994,347 B2 | 5/2024 | Ponec et al. | |
| 2004/0062063 A1 | 4/2004 | Siri | |
| 2004/0099261 A1 | 5/2004 | Litwin | |
| 2004/0148922 A1 | 8/2004 | Pinkerton | |
| 2004/0182081 A1 | 9/2004 | Sim et al. | |
| 2004/0211215 A1 | 10/2004 | Maier-Laxhuber et al. | |
| 2005/0126172 A1 | 6/2005 | Hudson et al. | |
| 2006/0107664 A1 * | 5/2006 | Hudson | F28D 20/0056 |
| | | | 60/659 |

(56) References Cited

U.S. PATENT DOCUMENTS

| | | |
|---|---|---|
| 2006/0174622 A1 | 8/2006 | Skowronski |
| 2006/0179840 A1 | 8/2006 | Murphy et al. |
| 2006/0211777 A1 | 9/2006 | Severinsky |
| 2006/0266039 A1 | 11/2006 | Skowronski et al. |
| 2006/0277910 A1 | 12/2006 | Hoetger |
| 2007/0209365 A1* | 9/2007 | Hamer .................... F28F 21/02 60/648 |
| 2007/0220889 A1 | 9/2007 | Nayef et al. |
| 2008/0000231 A1 | 1/2008 | Litwin et al. |
| 2008/0066736 A1 | 3/2008 | Zhu |
| 2008/0127647 A1 | 6/2008 | Leitner |
| 2008/0279761 A1 | 11/2008 | Kimura et al. |
| 2009/0038668 A1 | 2/2009 | Plaisted |
| 2009/0090109 A1 | 4/2009 | Mills et al. |
| 2009/0117633 A1 | 5/2009 | Bradley et al. |
| 2009/0208402 A1 | 8/2009 | Rossi |
| 2009/0320828 A1 | 12/2009 | Koketsu et al. |
| 2010/0101462 A1 | 4/2010 | Hayashi |
| 2010/0132391 A1 | 6/2010 | Barot |
| 2010/0178156 A1 | 7/2010 | Rivas Cortes et al. |
| 2010/0195357 A1 | 8/2010 | Fornage et al. |
| 2010/0229523 A1 | 9/2010 | Holt et al. |
| 2010/0251711 A1 | 10/2010 | Howes et al. |
| 2010/0295306 A1 | 11/2010 | Ridnik et al. |
| 2011/0083443 A1 | 4/2011 | Jockenhoevel et al. |
| 2011/0226440 A1 | 9/2011 | Bissell et al. |
| 2011/0247335 A1 | 10/2011 | Schmid et al. |
| 2011/0277469 A1* | 11/2011 | Brenmiller .............. F03G 6/114 60/641.8 |
| 2011/0286902 A1 | 11/2011 | Fan et al. |
| 2011/0289924 A1 | 12/2011 | Pietsch |
| 2012/0067047 A1 | 3/2012 | Peterson et al. |
| 2012/0102950 A1 | 5/2012 | Turchi |
| 2012/0131898 A1 | 5/2012 | Mokheimer et al. |
| 2012/0151926 A1* | 6/2012 | Labbe ....................... F01K 7/40 60/670 |
| 2012/0167559 A1 | 7/2012 | Havel |
| 2012/0241677 A1 | 9/2012 | Perkins et al. |
| 2012/0255309 A1 | 10/2012 | Venetos et al. |
| 2013/0025817 A1 | 1/2013 | Callaghan |
| 2013/0047976 A1 | 2/2013 | Kaftori |
| 2013/0081394 A1 | 4/2013 | Perry |
| 2013/0081395 A1 | 4/2013 | Frey et al. |
| 2013/0118169 A1 | 5/2013 | Milam et al. |
| 2013/0175006 A1 | 7/2013 | Robinson et al. |
| 2014/0004469 A1 | 1/2014 | Recourt et al. |
| 2014/0053554 A1 | 2/2014 | Tartibi et al. |
| 2014/0074314 A1 | 3/2014 | Niknafs et al. |
| 2014/0102073 A1 | 4/2014 | Pang et al. |
| 2014/0116069 A1 | 5/2014 | Peterson et al. |
| 2014/0190469 A1 | 7/2014 | O'Donnell et al. |
| 2014/0216717 A1 | 8/2014 | O'Donnell et al. |
| 2014/0223906 A1 | 8/2014 | Gee et al. |
| 2014/0224469 A1 | 8/2014 | Mirmobin et al. |
| 2014/0366536 A1 | 12/2014 | Muren |
| 2015/0033740 A1 | 2/2015 | Anderson et al. |
| 2015/0053266 A1 | 2/2015 | Chen et al. |
| 2015/0143806 A1 | 5/2015 | Friesth |
| 2015/0143811 A1 | 5/2015 | Pang et al. |
| 2015/0176920 A1 | 6/2015 | Vendeirinho |
| 2015/0224850 A1 | 8/2015 | Bank et al. |
| 2015/0267566 A1 | 9/2015 | Vamvas |
| 2015/0276234 A1 | 10/2015 | Muro et al. |
| 2015/0295508 A1 | 10/2015 | Conry |
| 2015/0354545 A1 | 12/2015 | Conlon |
| 2016/0130709 A1 | 5/2016 | Hong et al. |
| 2016/0146110 A1 | 5/2016 | Hackstein et al. |
| 2016/0164451 A1 | 6/2016 | Lenert et al. |
| 2016/0208657 A1 | 7/2016 | Brückner et al. |
| 2016/0214910 A1 | 7/2016 | King |
| 2017/0051949 A1 | 2/2017 | Uselton |
| 2017/0093163 A1 | 3/2017 | Johnson et al. |
| 2017/0204741 A1 | 7/2017 | Hogen et al. |
| 2017/0241649 A1 | 8/2017 | Cave |
| 2017/0241669 A1 | 8/2017 | von Behrens |
| 2017/0283713 A1 | 10/2017 | Stephens et al. |
| 2017/0362090 A1 | 12/2017 | Melsert et al. |
| 2017/0362724 A1 | 12/2017 | Planque et al. |
| 2018/0003445 A1* | 1/2018 | Bergan .................... F28D 20/00 |
| 2018/0028967 A1 | 2/2018 | Balfe et al. |
| 2018/0038352 A1 | 2/2018 | Conlon |
| 2018/0073777 A1 | 3/2018 | O'Donnell et al. |
| 2018/0083449 A1 | 3/2018 | Green |
| 2018/0106739 A1 | 4/2018 | Esmaili et al. |
| 2018/0163574 A1 | 6/2018 | Bailey et al. |
| 2018/0179955 A1* | 6/2018 | Apte ....................... F28F 13/14 |
| 2018/0207557 A1 | 7/2018 | Nellis |
| 2018/0216010 A1 | 8/2018 | Hong |
| 2018/0231316 A1 | 8/2018 | Watremetz et al. |
| 2018/0238563 A1 | 8/2018 | Stepa et al. |
| 2018/0245485 A1 | 8/2018 | Conlon |
| 2018/0292097 A1 | 10/2018 | Specter |
| 2018/0347406 A1 | 12/2018 | Friesth |
| 2018/0372337 A1 | 12/2018 | Walker |
| 2018/0372420 A1 | 12/2018 | Ahadi et al. |
| 2019/0003308 A1 | 1/2019 | Laughlin |
| 2019/0043624 A1 | 2/2019 | Fork et al. |
| 2019/0045617 A1 | 2/2019 | Fork et al. |
| 2019/0096535 A1 | 3/2019 | Olshansky et al. |
| 2019/0140477 A1 | 5/2019 | Yang et al. |
| 2019/0162482 A1 | 5/2019 | Kerth |
| 2019/0170436 A1 | 6/2019 | De et al. |
| 2019/0186786 A1 | 6/2019 | Neiser |
| 2019/0226462 A1 | 7/2019 | Conlon |
| 2019/0245224 A1 | 8/2019 | Lacroix et al. |
| 2019/0331098 A1 | 10/2019 | von Behrens et al. |
| 2019/0359894 A1 | 11/2019 | Heidel et al. |
| 2020/0095984 A1 | 3/2020 | Karni et al. |
| 2020/0124356 A1 | 4/2020 | Ma et al. |
| 2020/0172815 A1 | 6/2020 | Stephens et al. |
| 2020/0217518 A1 | 7/2020 | Field et al. |
| 2020/0232345 A1 | 7/2020 | Zwinkels |
| 2020/0332201 A1 | 10/2020 | Koseoglu et al. |
| 2020/0346165 A1 | 11/2020 | Lu et al. |
| 2020/0378599 A1 | 12/2020 | Risseeuw et al. |
| 2020/0386447 A1 | 12/2020 | Wang |
| 2021/0053689 A1 | 2/2021 | Lynn et al. |
| 2021/0094834 A1 | 4/2021 | Chen et al. |
| 2021/0143446 A1 | 5/2021 | Ponec et al. |
| 2021/0172685 A1* | 6/2021 | Bergan .................. F28D 20/028 |
| 2021/0190044 A1 | 6/2021 | Anderson et al. |
| 2021/0207527 A1 | 7/2021 | Robinson |
| 2021/0211066 A1 | 7/2021 | Vavilpalli et al. |
| 2021/0325069 A1 | 10/2021 | Cotton et al. |
| 2021/0328544 A1 | 10/2021 | Johnson et al. |
| 2022/0049615 A1 | 2/2022 | Truong |
| 2022/0060142 A1 | 2/2022 | Akhavan-Tafti |
| 2022/0085603 A1 | 3/2022 | McNamara et al. |
| 2022/0090827 A1 | 3/2022 | Magaldi et al. |
| 2022/0132633 A1 | 4/2022 | Forsberg et al. |
| 2022/0146205 A1 | 5/2022 | Eronen et al. |
| 2022/0170386 A1 | 6/2022 | O'Donnell et al. |
| 2022/0228271 A1 | 7/2022 | Ashok et al. |
| 2022/0228772 A1 | 7/2022 | Murata et al. |
| 2022/0268179 A1 | 8/2022 | O'Donnell et al. |
| 2022/0290929 A1 | 9/2022 | Doerbeck |
| 2022/0307386 A1 | 9/2022 | Savic et al. |
| 2022/0403759 A1 | 12/2022 | Stapp, III et al. |
| 2023/0216297 A1 | 7/2023 | Peri et al. |
| 2023/0407186 A1 | 12/2023 | Sundaram et al. |
| 2024/0092646 A1 | 3/2024 | Isobe et al. |
| 2025/0026986 A1 | 1/2025 | Zellhuber et al. |

FOREIGN PATENT DOCUMENTS

| | | |
|---|---|---|
| AU | 2016204109 B2 | 5/2018 |
| CH | 703751 A1 | 3/2012 |
| CN | 1559893 A | 1/2005 |
| CN | 101799200 A | 8/2010 |
| CN | 101592439 B | 4/2011 |
| CN | 104242433 A | 12/2014 |
| CN | 104296577 B | 4/2016 |
| CN | 105605957 A | 5/2016 |
| CN | 105948037 A | 9/2016 |

(56) References Cited

FOREIGN PATENT DOCUMENTS

| | | |
|---|---|---|
| CN | 106052451 A | 10/2016 |
| CN | 106247836 A | 12/2016 |
| CN | 107246732 A | 10/2017 |
| CN | 107872196 A | 4/2018 |
| CN | 108204760 A | 6/2018 |
| CN | 108362151 A | 8/2018 |
| CN | 108362152 A | 8/2018 |
| CN | 108612634 A | 10/2018 |
| CN | 106767074 B | 12/2018 |
| CN | 109883241 A | 6/2019 |
| CN | 110411260 A | 11/2019 |
| CN | 111256364 A | 6/2020 |
| CN | 210802160 U | 6/2020 |
| CN | 211183438 U | 8/2020 |
| CN | 111655989 A | 9/2020 |
| CN | 112113203 A | 12/2020 |
| CN | 212157096 U | 12/2020 |
| CN | 113835372 A | 12/2021 |
| CN | 114754617 A | 7/2022 |
| DE | 19808810 C1 | 6/1999 |
| DE | 10029732 A1 | 1/2002 |
| DE | 102009020531 B3 | 4/2011 |
| DE | 102013212981 A1 | 1/2015 |
| DE | 102017212684 A1 | 1/2019 |
| EP | 0079247 A1 | 5/1983 |
| EP | 794161 B1 | 7/1996 |
| EP | 1930587 A2 | 6/2008 |
| EP | 2372116 A1 | 10/2011 |
| EP | 2722496 A2 | 4/2014 |
| EP | 3081770 A1 | 10/2016 |
| EP | 3324018 A1 | 5/2018 |
| EP | 3486594 A1 | 5/2019 |
| EP | 2837086 B1 | 11/2019 |
| EP | 3245388 B1 | 11/2019 |
| EP | 3725917 A1 | 10/2020 |
| EP | 2909547 B1 | 9/2021 |
| EP | 3642296 A1 | 1/2022 |
| GB | 2109026 A | 5/1983 |
| GB | 2152652 A | 8/1985 |
| GB | 2477801 A | 8/2011 |
| IL | 284451 | 8/2021 |
| JP | 2006145200 A | 6/2006 |
| KR | 2001-0100320 A | 11/2001 |
| KR | 102308531 B1 | 10/2021 |
| MA | 40029 A | 12/2015 |
| TW | 202100240 A | 1/2021 |
| WO | WO 1980/000170 | 2/1980 |
| WO | WO 2007/108014 A1 | 9/2007 |
| WO | WO 2008/052249 A1 | 5/2008 |
| WO | WO 2008/108870 A1 | 9/2008 |
| WO | WO 2009/152562 A1 | 12/2009 |
| WO | 2011/066039 A1 | 6/2011 |
| WO | WO 2011/077248 A2 | 6/2011 |
| WO | WO 2011/109514 A1 | 9/2011 |
| WO | WO 2012/123853 A1 | 9/2012 |
| WO | WO 2012/127178 A1 | 9/2012 |
| WO | WO 2012/150969 A1 | 11/2012 |
| WO | WO 2013/020176 A1 | 2/2013 |
| WO | WO 2014/063191 A1 | 5/2014 |
| WO | WO 2014/151843 A2 | 9/2014 |
| WO | WO 2015/149124 A1 | 10/2015 |
| WO | WO 2015/187423 A2 | 12/2015 |
| WO | WO 2016/065191 A1 | 4/2016 |
| WO | WO 2016/150455 A1 | 9/2016 |
| WO | 2017/001710 A1 | 1/2017 |
| WO | WO 2017/049320 A1 | 3/2017 |
| WO | WO 2017/147022 A1 | 8/2017 |
| WO | WO 2018/011363 A1 | 1/2018 |
| WO | WO 2018/101989 A1 | 6/2018 |
| WO | 2018164647 A1 | 9/2018 |
| WO | WO 2019/020562 A1 | 1/2019 |
| WO | WO 2019/149623 A1 | 8/2019 |
| WO | WO 2019/224538 A1 | 11/2019 |
| WO | WO 2020/068758 A1 | 4/2020 |
| WO | 2020/136456 A1 | 7/2020 |
| WO | WO 2020/254001 A1 | 12/2020 |
| WO | WO 2022/086630 A1 | 4/2022 |
| WO | 2022/187903 A1 | 9/2022 |
| ZA | 201603514 B | 11/2018 |

OTHER PUBLICATIONS

Mecys Palsauskas & al.: "Device ensuring effective usage of photovoltaics for water heating", Electrical Engineering, 101 (1),189-202, Apr. 8, 2019 (Apr. 8, 2019), DOI: 10.1007/s00202-019-00766-0.

Sharadga, Hussein, et al., "A hybrid PV/T and Kalina cycle for power generation", Int J Energy Res. 2018;42:4817-4829, https://doi.org/10.1002/er.4237, dated Sep. 7, 2018.

"Ethylene Production via Cracking of Ethane-Propane", Chemical Engineering, Nov. 1, 2015, Total pp. 4.

"Matching Time of Use Periods With Grid Conditions Maximizes Use of Renewable Resources", California ISO, Outcropping Way, Folsom, 2015, Total pp. 2.

"Miscibility Gap Alloys", University of Newcastle, accessed at https://miscibilitygapalloy.blogspot.com/p/how-did-it-stater-ted.html on Apr. 2, 2022.

Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.

Alexis McKittrick, "Low Temperature & Coproduced Resources Reservoir Thermal Energy Storage (RTES) Portfolio", Geothermal Technologies Office, U.S. Department of Energy, Total pp. 4.

Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.

Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.

Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.

Bao Truong, "Malta Pumped Heat Energy Storage System Green Heat & Power Application", Energy Storage for Manufacturing and Industrial Decarbonization Workshop, Feb. 9, 2022, Total pp. 5.

Ben Bollinger, "Malta Pumped Heat Energy Storage", Malta, Aug. 10, 2021, Total pp. 9.

Cédric Philibert, "Renewable Energy for Industry", Renewable Energy Division, International Energy Agency, Nordic Pavillion, COP23, Fidji—Bonn, Nov. 15, 2017, Total pp. 7.

Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.

Charles Forsberg et al., "Variable Electricity from Base-load Nuclear Power Plants Using Stored Heat", International Congress on Advances in Nuclear Power Plants (ICAPP 2015), May 2015, Total pp. 12.

Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.

Charles Forsberg, "Hybrid systems to address seasonal mismatches between electricity production and demand in nuclear renewable electrical grids", Energy Policy, vol. 62, Nov. 2013, pp. 333-341, Total pp. 9.

Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.

Christopher Fraughton, "Electro-Thermal Energy Storage General Presentation", MAN Energy Solutions, Aug. 2021, Total pp. 23.

CK-12 Foundation, "Saturated Hydrocarbon", Apr. 2, 2022, Total pp. 8.

Cowper Stove an overview ScienceDirect Topics, Sep. 13, 2021, Total pp. 25.

(56) References Cited

OTHER PUBLICATIONS

D. Fernandes et al., "Thermal energy storage: How previous findings determine current research priorities", Energy, vol. 39, Issue 1, Mar. 2012, pp. 246-257, Total pp. 12.
Daniel C Stack et al., "Performance of firebrick resistance-heated energy storage for industrial heat applications and round-trip electricity storage", Applied Energy, vol. 242, May 15, 2019, pp. 782-796, Total pp. 15.
Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.
Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.
David L. Chandler "MIT News: Turning desalination waste into a useful resource" MIT News Office, Feb. 13, 2019 (Cited in NFOA dated Sep. 14, 2022 in related U.S. Appl. No. 17/650,522.).
David Roberts, "Solar power's greatest challenge was discovered 10 years ago. It looks like a duck", www.vox.com, Aug. 29, 2018, Total pp. 19.
Dr. Eric L. Miller, "The Hydrogen Energy Earthshot and H2@Scale: Importance to Industrial Decarbonization", Energy StorM Panel, Feb. 8, 2022, Total pp. 9.
Dr. Gianluca Ambrosetti et al., "Cement Production", Energy Storage for Manufacturing and Industrial Decarbonization Workshop "Energy StorM", Feb. 8, 2022, Total pp. 10.
Elizabeth Endler, "Energy Storage for Manufacturing Petrochemical Industry Perspective", Feb. 8, 2022, "Energy StorM" Workshop, US Department of Energy, Total pp. 14.
Elliott Group, "Materials for Hydrogen Compression", Thermo-Mechanical-Chemical Energy Storage Workshop, Elliott, Aug. 10-11, 2021, Total pp. 25.
Emiliano Bellini, "Long-duration thermal storage system based on silica sand", pv magazine International, Nov. 5, 2021, Total pp. 6.
Emiliano Bellini, "Storing wind, solar power with silica sands", pv magazine International, Sep. 1, 2021, Total pp. 10.
Gregory C Staple, "California's Grid Geeks: Flattening the 'duck curve'", Jan. 25, 2017, www.greenbiz.com, Total Page Count 9.
Grid Energy Storage, U.S. Department of Energy, Dec. 2013, Total pp. 67.
Haisheng Chen et al., "Progress in electrical energy storage system: A critical review", Progress in Natural Science, vol. 19, Issue 3, Mar. 10, 2009, pp. 291-312, Total pp. 22.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.
Hélder Da Silva, "Energy Storage for Manufacturing and Industrial Decarbonization Workshop "Energy StorM"", Feb. 8, 2022, Total pp. 11.
Hitesh Bindra et al., "Sliding flow method for exergetically efficient packed bed thermal storage", Applied Thermal Engineering, vol. 64, Issues 1-2, Mar. 2014, pp. 201-208, Total pp. 8.
Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.
Ilievski D, "New Two-Stage Calcination Technology", Proceedings of the 9th International Alumina Quality Workshop, Alcoa World Alumina, Technology Delivery Group, Western Australia, 2012, Total pp. 7.
Industrial Decarbonization using Electric Thermal Energy Storage (ETES), Jan. 25, 2022, Total pp. 11.
International Search Report mailed on Sep. 14, 2022 for International Application No. PCT/US2021/061041, 41 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.
Jay Fitzgerald, "Bioenergy and Chemical Energy Storage", Energy Storage for Manufacturing & Industrial Decarbonization Workshop, Feb. 8-9, 2022, Total pp. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.
Joe Cresko, "Energy Storage for Manufacturing", Energy Storage for Manufacturing & Industrial Decarbonization Workshop, Feb. 8-9, 2022, Total pp. 11.
Joe Paladino, "Transformation of the Electric Grid", Energy StorM Workshop, Feb. 4, 2022, Total pp. 5.
Joe Stekli, "LCRI Update TMCES 2021", Low-Carbon Resources Initiative, Electric Power Research Institute, Aug. 2021, Total pp. 31.
Lion Hirth, "The market value of variable renewables: The effect of solar wind power variability on their relative price", Energy Economics, vol. 38, Jul. 2013, pp. 218-236, Total pp. 19.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2019, Total pp. 7.
Marc Medrano et al., "State of the art on high-temperature thermal energy storage for power generation. Part 2—Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total pp. 75.
Michael Pesin, "The Office of Electricity Grid Modernization R&D Portfolio", Aug. 2, 2021, Total pp. 18.
PCT; Invitation to Pay Additional Fees issued in International Patent Application No. PCT/US2021/061041; mailed Mar. 24, 2022; 21 Pages.
Pintail Power LLC, "Liquid Air Combined Cycle Hybrid Energy Storage", Pintail Power LLC, TMCES Workshop, Aug. 10-11, 2021, San Antonio, TX, Total pp. 12.
Office Action in U.S. Appl. No. 17/650,519 mailed Apr. 20, 2022, 10 pages.
R. B. Laughlin, "Variable Blading in Closed-Cycle Brayton Energy Storage", TMCES, Aug. 10, 2021, San Antonio, Total pp. 26.
Rainer Kurz, "Hydrogen Pipelines & Storage", Mar. 8, 2021, Total pp. 16.
Revterra, "Revterra Company Overview", TMCES 2021, Total pp. 14.
Reyad Sawafta, "Thermal Energy Storage—Cold Storage", Energy Storage for Manufacturing and Industrial Decarbonization Workshop, Feb. 9, 2022, Total pp. 11.
Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.
Richard T. Ibekwe, "Induction Heating of Firebricks for the Large-Scale Storage of Nuclear and Renewable Energy", Massachusetts Institute of Technology, Jun. 2018, Total pp. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.
Russ Weed, "Market Needs & Technology Overview", Thermal-Mechanical-Chemical Energy Storage Workshop—Storage Deployment, Aug. 11, 2021, Total pp. 20.
S. W. Sucech et al., "Alcoa Pressure Calcination Process for Alumina", Light Metals 1986, R.E. Miller, 669-674, Total pp. 6.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.

(56) References Cited

OTHER PUBLICATIONS

Scott Hume, "Mid-Duration Energy Storage (MDES) Benefits and Challenges", 3rd TMCES Workshop, 10 Aug. 10, 2021, Total pp. 11.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Siemens AG, "Compressed Air Energy Storage (CAES)", 3rd Thermal-Mechanical-Chemical Energy Storage Workshop, Siemens Energy, Aug. 2021, Total pp. 17.
Soteris Kalogirou, "The potential of solar industrial process heat applications", Applied Energy, vol. 76, Issue 4, Dec. 2003, pp. 337-361, Total pp. 25.
Stefica Nicol Bikes, "Australian engineers patent thermal block to store renewable energy", www.reuters.com, Oct. 27, 2021, Total pp. 6.
Storworks Power, 3rd Thermal-Mechanical-Chemical Energy Storage Workshop, Aug. 10, 2021, Total pp. 8.
Swagelok Energy Advisors Inc, "Steam Quality—Plant Operations Require a High Steam Quality", Steam Systems Best Practices, Document No. 23, 2009, Total pp. 3.
T. Fiedler et al., "Thermal capacitors made from Miscibility Gap Alloys (MGAs)", WIT Transactions on Ecology and the Environment, vol. 186, 2014, Total pp. 8.
Timothy C. Allison, "Thermal-Mechanical-Chemical Energy Storage Technology Overview and Research Activities", Southwest Research Institute, Aug. 9, 2021, Total pp. 22.
Tony Bowdery et al., "Heat Exchangers for Thermal Energy Storage: Challenges and Mitigation", Meggitt, Aug. 2021, Total pp. 20.
Trevor Brown, "Ammonia: the other hydrogen", Energy Storage for Manufacturing and Industrial Decarbonization Workshop "Energy StorM", Feb. 9, 2022, Total pp. 13.
Veera Gnaneswar Gude, "Energy storage for desalination processes powered by renewable energy and waste heat sources", Applied Energy, vol. 137, Jan. 1, 2015, pp. 877-898, Total pp. 22.
Vishal Sardeshpande, "Performance analysis for glass furnace regenerator", Applied Energy, vol. 88, Issue 12, Dec. 2011, pp. 4451-4458, Total pp. 8.
Whitlock, "NREL scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.
Written Opinion of the International Searching Authority mailed on Sep. 14, 2022 for PCT/US2021/061041, 25 pages.
International Search Report and Written Opinion mailed on May 17, 2024 for International Application No. PCT/US2023/085826, 14 pages.
Ji, Huichao, et al., "Electricity Consumption Prediction of Solid Electric Thermal Storage with a Cyber-Physical Approach", Energies 2019, 12, 4744; doi: 10.3390/en12244744, www.mdpi.com/journal/energies, published on Dec. 12, 2019, in 18 pages.
Reply to Communication Under Rule 71(3) EPC, received in corresponding EP App. No. 21 843 808.3, submitted May 6, 2024, in 9 pages.
Third Party Objections raised in corresponding EP App. No. 21 843 808.3, dated Apr. 30, 2024, with English Translation, in 8 pages.
Zhao, Haichuan, et al., "Thermal Calculation and Experimental Investigation of Electric Heating and Solid Thermal Storage System", Energies 2020, 13, 5241; doi:10.3390/en13205241, www.mdpi.com/journal/energies, published on Oct. 9, 2020, in 20 pages.
Dr. Jeffrey Goldmeer, "Power to Gas: Hydrogen for Power Generation Fuel Flexible Gas Turbines as Enablers for a Low or Reduced Carbon Energy Ecosystem," GE Power, Feb. 2019, 19 pages.
GE Energy Storage Unit RSU-4000, Modular, Scalable Energy Storage Solution for Utility-Scale Applications; www/ge.com/energystorage; 2020, 1 page.
Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Accepted Mar. 4, 2020; 20 pages.
How thermal power plants can benefit from the energy transition, The Future of Energy 2019, Siemens Gamesa Renewable Energy, 10 pages.
Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.
International Search Report and Written Opinion mailed on Aug. 23, 2024 for International Application No. PCT/US2024/024158, 9 pages.
Zhou et al., "Highly Conductive Porous Graphene/Ceramic Composites for Heat Transfer and Thermal Energy Storage," Adv. Funct. Mater., 2013, 23, pp. 2263-2269.
International Search Report and Written Opinion mailed on Dec. 20, 2024 for International Application No. PCT/US2024/024156, 29 pages.
Isong, Jian, et al., "Combined supercritical CO2 (SCO2) cycle and organic Rankine cycle (ORC) system for hybrid solar and geothermal power generation: Thermoeconomic assessment of various configurations", (Year: 2021), in 16 pages.
Echogen, "CO2-Based Pumped-Thermal Energy Storage Technical Overview & Status", Echogen Power System, Total pp. 20, Aug. 10-11, 2021.
Jeff Moore, "Oxygen Storage Incorporated into the Allam OxyFuel Power Cycle", Southwest Research Institute, Total pp. 8, Aug. 10-11, 2021.
Sempra Energy Utility, "SoCalGas", Total pp. 6, Oct. 2021.
Clifford K. Ho, "High-Temperature Thermal Storage in Moving and Fixed Particle Beds", Thermal-Mechanical-Chemical Energy Storage (TMCES) Workshop, San Antonio, TX, dated Aug. 10, 2021. Total pp. 13.
Daniel Stack et. al., "Joule Hive-Replacing fire with renewable heat", Aug. 28, 2021, Total pp. 15.
David Bierman, "Clean, affordable, and reliable heat & electricity", Antora Energy, Feb. 2022, Total pp. 9.
Dr. Avi Shultz, "Concentrating Solar-thermal Power and Thermal Energy Storage", U.S. Department of Energy, dated Feb. 8, 2022. Total pp. 7.
Dr. Avi Shultz, "Industrial Decarbonization:Renewable Process Heating from Concentrating Solar Thermal", U.S. Department of Energy, dated Feb. 8, 2022. Total pp. 6.
Joshua Schmitt, "Development of an Advanced Hydrogen Energy Storage System Using Aerogel in a Cryogenic Flux Capacitor (Cfc)", Southwest Research Institute, Aug. 10, 2021, Total pp. 8.
Lion Hirth, "The Optimal Share of Variable Renewables: How the Variability of Wind and Solar Power affects their Welfare-optimal Deployment", The Energy Journal, vol. 36, No. 1, p. 149-184, (2015). Total pp. 36.
Lori Schaefer-Weaton, "Solar & Battery Energy Solution Agri-Industrial Plastics Co.", Agri-Industrial Plastics Company, Feb. 2022, Total pp. 12.
Mike Gravely, "The Role of Energy Storage in Helping California Meet the State's Future Zero Carbon Energy Goals", Energy Research and Development Division, California, 2021, Total pp. 23.
Natalie Smith et al., "Integration of Pumped Heat Energy Storage with a Fossil-Fired Power Plant", U.S. Department of Energy, 2021, Total pp. 6.
Siemens Gamesa, "Electric Thermal Energy Storage (ETES)—Industrial Decarbonization", Siemens Gamesa Renewable Energy, 2020, Total pp. 9.
Steffes, ThermElect Hydronic, Demand-Free, Off-Peak Heating, May 2020, Total pp. 2.
Thomas A. Buscheck, "Hybrid-energy technology enabled by heat storage and oxy-combustion for power and industrial-heat applications with near-zero or negative CO2 emissions", Thermal-Mechanical-Chemical Energy Storage Workshop, San Antonio, Texas, Aug. 10, 2021, Total pp. 22.
Todd Brix, "Converting Carbon. Storing Energy", Richland, Washington U.S.A., Feb. 9, 2022, Total pp. 13.

(56) References Cited

OTHER PUBLICATIONS

Torbjörn Lindquist, "Powering the evolution of a renewable society, by redefining energy infrastructure", Azelio, Feb. 7, 2022, Total pp. 10.

Travis McLing et al., "Dynamic Earth Energy Storage: Grid Scale Energy Storage using Planet Earth as a Thermal Battery (RTES)", Feb. 2022, Total pp. 7.

Ametek Process Instruments, "Reduce Nox Emissions While Improving Fuel Efficiency", EDG Series Gas Analyzers, Year: 2018, in 2 pages.

Fakhroleslam, Mohammad, et al., "Thermal/catalytic cracking of hydrocarbons for the production of olefins; a state-of-the-art review III: Process modeling and simulation", Elsevier, www.elsevier.com/locate/fuel, Fuel 252 (2019) 553-566, in 14 pages.

Sakakibara, Reyu, et al., "Practical emitters for thermophotovoltaics: a review", Journal of Photonics for Energy, vol. 9, Issue 3, 032713 (Feb. 2019), https://doi.org/10.1117/1.JPE.9.032713, in 38 pages.

\* cited by examiner

THERMAL ENERGY STORAGE SYSTEMS FOR REPOWERING EXISTING POWER PLANTS FOR IMPROVING EFFICIENCY AND SAFETY

CROSS-REFERENCE TO RELATED APPLICATIONS

This application claims priority under 35 USC § 119(e) to:
U.S. Provisional Patent Application No. 63/427,374 filed on Nov. 22, 2022,
U.S. Provisional Patent Application No. 63/434,919 filed on Dec. 22, 2022,
U.S. Provisional Patent Application No. 63/459,540 filed on Apr. 14, 2023,
and
U.S. Provisional Patent Application No. 63/578,139 filed on Aug. 22, 2023.

This application claims priority under 35 USC § 120 as a continuation-in-part of:
U.S. patent application Ser. No. 18/106,428, filed on Feb. 6, 2023, which is a continuation of U.S. patent application Ser. No. 17/668,342, filed on Feb. 9, 2022, now granted as U.S. Pat. No. 11,572,811, which is a Continuation of U.S. patent application Ser. No. 17/537,407, filed Nov. 29, 2021, now granted as U.S. Pat. No. 11,603,776, which claims priority to the following provisional applications:
U.S. Provisional Patent Application No. 63/119,443, filed Nov. 30, 2020
U.S. Provisional Patent Application No. 63/155,261, filed Mar. 1, 2021
U.S. Provisional Patent Application No. 63/165,632, filed Mar. 24, 2021
U.S. Provisional Patent Application No. 63/170,370, filed Apr. 2, 2021
U.S. Provisional Patent Application No. 63/231,155, filed Aug. 9, 2021.

The following patent applications and patent are directed to related technologies:
U.S. patent application Ser. No. 17/537,407 (filed Nov. 29, 2021; issued as U.S. Pat. No. 11,603,776 on Mar. 14, 2023), and
International Patent Application No.: PCT/US2021/061041 (filed Nov. 29, 2021).

The foregoing applications and patent are incorporated herein by reference in their entirety for all purposes.

BACKGROUND

Technical Field

The present disclosure relates to thermal energy storage and utilization systems. More particularly, the present disclosure relates to an energy storage system that stores electrical energy in the form of thermal energy, which can be used for the continuous supply of hot air, carbon dioxide ($CO_2$), steam or other heated fluids, for various applications including the supply of heat for power generation. More specifically, the present disclosure relates to using thermal energy storage systems to improve efficiency, safety, and operating costs associated with existing power plants.

Related Art

I. Thermal Energy Systems
A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy—different heating processes or industrial processes—require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into storage media, and then transferred at another time from storage media to an outlet. The rate of heat transfer into and out of storage media is limited by factors including the heat conductivity and capacity of the media, the surface area across which heat is transferring, and the temperature difference across that surface area. High rates of charging are enabled by high temperature differences between the heat source and the storage medium, high surface areas, and storage media with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g. radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the bricks closest to the heating wire are heated more than the bricks that are further away from the heating wire. As a result, the failure rate for the wire is likely to increase, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into account these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion. There is also a need to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Storage of Intermittent Energy

Fossil fuels have driven the world economy since the industrial revolution; however, mankind has discovered that not only is there a limited supply of these energy resources, but also that the combustion of fossil fuels to extract their energy produces greenhouse gases and other pollutants that threaten planet-wide ecosystems. Specifically, such systems are inherently inefficient in their use of the energy locked up in chemical bonds because they emit innumerable tons of hot combustion gases out smokestacks into our atmosphere, directly causing global warming, indirectly causing global warming through the effects of greenhouse gas emissions on the increased absorption of sunlight by planet Earth, as well as the effects of the pollutants' contribution to the degradation of our planet through, for example, the washing of the Earth's various ecosystems in acid rain.

Energy sources that address this problem, such as solar energy, wind energy, and tidal energy are being developed to meet our need for renewable energy sources that do not generate these harmful greenhouse gases. One drawback that renewable energy sources have is that they are of an intermittent nature. The sun does not always shine; the wind does not always blow; tides are not always flowing. This has prevented these technologies from becoming replacements for fossil fueled energy sources, since industry requires power on demand, 24 hours a day, 365 days a year.

Therefore, what is needed is a way to store the intermittent energy that renewable energy sources provide in a closed loop to meet the constant power demands of industry without expelling heat and pollutants to the atmosphere. This has led to the development of green energy storage solutions, as well as the systems and methods for heat storage and extraction from structured solid blocks in thermal energy storage units as described herein.

One hurdle that lies between the conception and initial development of thermal storage solutions and their actual implementation is the interfacing of such solutions with existing industrial equipment to make use of existing assets and infrastructure. Consequently, what is needed are systems for the modularization of such thermal energy storage units that may be combined in various fashions to provide for customized solutions that meet the individual needs for retrofitting such fossil fuel fired power systems. Furthermore, there is a great need to enable the evaluation of thermal energy storage units as a green energy alternative to existing fuel fired boiler systems without redesigning and rebuilding existing industrial infrastructure. Along these lines, what is desperately needed are systems that allow for easily switching between fossil fuel energy sources and variable renewable electricity sources to evaluate the latter as replacements for existing fossil fuel fired energy sources. This would greatly help achieve the worldwide goals set forth in the Paris Climate Accord, in particular a 45% reduction in greenhouse gas emissions by 2030, with a net zero emission goal target set for 2050. In particular, systems and methods for the coupling of one or more thermal energy storage units to fuel fired boiler systems is needed, along with control systems that coordinate the operation of systems containing multiple thermal energy storage units. This coupling of two completely different energy sources allows for reversibly evaluating this new sustainable technology for the possible retrofitting or replacement of the fossil fuel based systems with a green energy supply, while retaining much of the capital equipment that is already paid for and in service.

SUMMARY

The example implementations advance the art of thermal energy storage and enable the practical construction and operation of high-temperature thermal energy storage systems can charge by VRE, store energy in solid media, and deliver high-temperature heat.

Thermal energy storage systems can be used to repower existing fuel fired power plants by integrating a thermal energy storage (TES) unit with the existing steam turbine generator at the power plant. This integration is realized by interconnecting the main steam pipelines (such as high-pressure steam piping, hot reheat steam piping, and/or cold reheat steam piping) and the feedwater pipes with valves that allow the dual operation (the fuel fired boilers and with the TES unit(s)). In some embodiments, the fuel fired boilers are removed and the power plant is powered by only steam generator(s) with the TES unit(s). The TES powered steam generators are both less polluting and more efficient than existing fossil fuel fired boilers. When a fossil fuel fired boiler is used, it combusts fuel that creates heat for the boiler but also creates gas emissions that are exhausted into the atmosphere by smokestacks associated with the fossil fuel burner. The TES system, by contrast, is typically a closed-loop system and does not have combustion byproducts that need to be exhausted to the external environment. Furthermore, because the TES is typically a closed-loop system, any remaining heated flow is redirected back to the inlet of the TES system to be heated again for use in the system, instead of like a fossil fuel fired boiler with exhausts residual heat along with any combustion byproducts into the atmosphere. This recapture and reuse of residual heat increases the efficiency of the TES power steam generator.

Optionally, a single TES unit can be configured to operate with two superheaters or heat exchangers: 1) one for intermediate pressure to take the cold reheat input and raise its temperature to the admission temperature of the steam turbine, and 2) one for a high-pressure section for the high-pressure steam superheating. The TES units can be equipped with thermal storage materials that store energy at high temperatures (above 1000° C.). This high temperature heat source enables the design of a heat recovery steam generator (HRSG) which integrates a high-pressure steam loop and an intermediate-pressure steam loop in the same TES powered steam generator. Optionally, some embodiments store energy between about 1000° C. and 600° C.

In most implementations, the existing balance of plant which includes deaerators, flash tanks, blowdown tanks, pumps, condensate system and cooling system typically do not need any adjustment. Optionally, the feedwater pumps head may be assessed against the new piping routing for integrating one or more of the TES-powered steam generator.

In another implementation, multiple TES units can be integrated to function collectively as a single boiler or steam generator and operated all in parallel or combinations of parallel units to provide steam conditions at the same pressure level as the existing fossil fuel fired boiler or at a pressure level desired by the power plant. In such an implementation, a steam header can be used to combine the flow of multiple steam outputs from the multiple TES units and direct them with any existing fossil fuel fired boilers to an industrial load that will use the steam. Optionally, the steam generator includes multiple TES units that can be isolated and run independently, instead of in a parallel configuration.

In a still further implementation, a steam system is configured to power an industrial load such as, but not limited to, a steam turbine or a turbine generator that outputs electricity for use as retail local power. The system uses a TES unit to heat a steam or water in the steam generator. To ensure that the return feed to the system is at a temperature low enough to be acceptable, steam extraction port(s) of the steam turbine are in a closed configuration to not further heat any return steam or water flow in the system. The TES unit can transfer thermal energy to the steam generator directly or the TES unit could heat a working fluid such as molten salt or a gas such as air, carbon dioxide, nitrogen, or any combination thereof. The TES unit can heat the working fluid by convection and/or radiation. The heated working fluid can then be passed over one or more heat exchangers in the steam generator.

The steam generator can be configured to have one or more heat exchangers. In some embodiments, at least two heat exchangers receive thermal energy from the TES unit and one or both of the heat exchanger can be superheaters. It should be understood that the system can be designed to have more or fewer heat exchangers. A first steam circuit connects one of the heat exchangers to the industrial load, providing steam to the industrial load at a first temperature and a first pressure. A second steam circuit connects another of the heat exchangers to the industrial load, providing steam to the industrial load at a second temperature lower than the first temperature and at a second pressure lower than the first pressure. The system may further include a control system configured to adjust the boiler such that the first pressure is in a first target pressure range and the second pressure is in a second target steam pressure range. The TES unit stores energy at high temperatures between about 1000° C. and 600° C., which enables the high-pressure steam loop and the lower pressure steam loop in the same TES powered steam generator.

In another embodiment, a heat recovery steam generator with increased efficiency integrates a high-pressure steam heat exchanger bundle to produce superheated steam and an intermediate-pressure steam heat exchanger bundle to heat up the cold reheat at an intermediate-pressure level. The heat recovery steam generator captures heat from the thermal energy storage unit from an air circulating closed loop. The air leaving the steam generator is captured by an induced draft fan which pushes it back into the thermal energy storage unit. This closed loop avoids the usual energy losses that conventional power plants suffer from exiting the combustion flue gases by a stack. As a result, the overall thermal efficiency of a TES unit is superior to a conventional boiler, where flue gases from combustion are released to the atmosphere, losing a large fraction of energy with them. A TES powered system, by its closed-loop design, redirects low temperature working fluid back to the TES unit to be reheated back to an operating temperature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776.

U.S. Pat. No. 11,603,776 relates to the field of thermal energy storage and utilization systems and addresses the above-noted problems. A thermal energy storage system is disclosed that stores electrical energy in the form of thermal energy in a charging mode and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
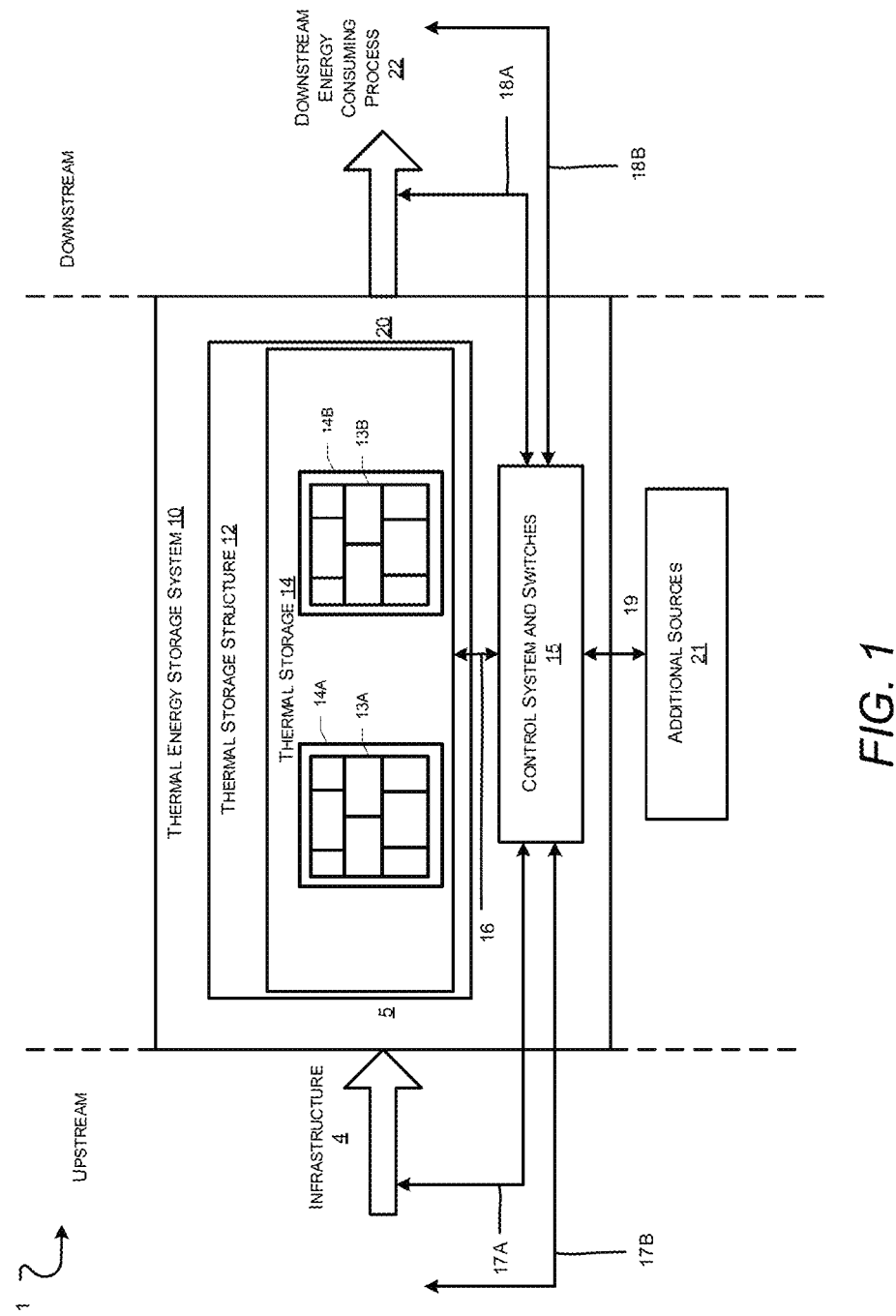
FIG. 1 illustrates a schematic diagram of the thermal energy storage system architecture according to the example implementations.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of solid storage media (e.g., 13A, 13B) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage media within the assemblages may variously be referred to as thermal storage blocks, bricks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter solid storage media, and absorbed and stored in solid media within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various embodiments.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2 and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently storage energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
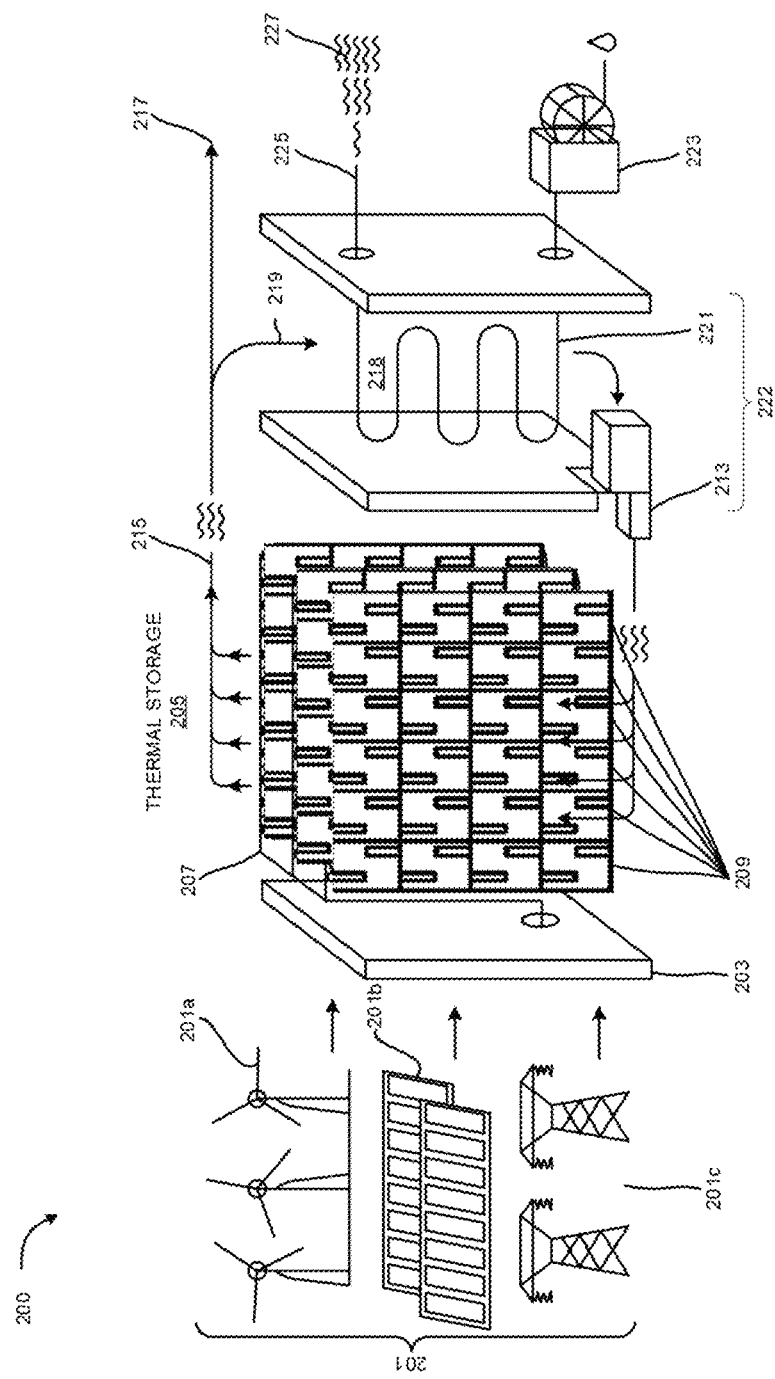
FIG. 2 illustrates a schematic diagram of a system according to the example implementations.

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201a, solar energy from photovoltaic cells 201b, or other energy sources may provide electricity that is variable in availability or price because the conditions for generating the electricity are varied. For example, in the case of wind turbine 201a, the strength, duration and variance of the wind, as well as other weather conditions causes the amount of energy that is produced to vary over time. Similarly, the amount of energy generated by photovoltaic cells 201b also varies over time, depending on factors such as time of day, length of day due to the time of year, level of cloud cover due to weather conditions, temperature, other ambient conditions, etc. Further, the input electricity may be received from the existing power grid 201c, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage media 209. Thermal storage components (sometimes called "bricks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented-one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by bricks in each of the arrays 209, with flow controlled by louvers. By the release of heat energy from the resistive heating elements 207, heat is radiatively transferred to arrays 209 of bricks during a charging mode. Relatively hotter brick surfaces reradiate absorbed energy (which may be referred to as a radiative "echo") and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
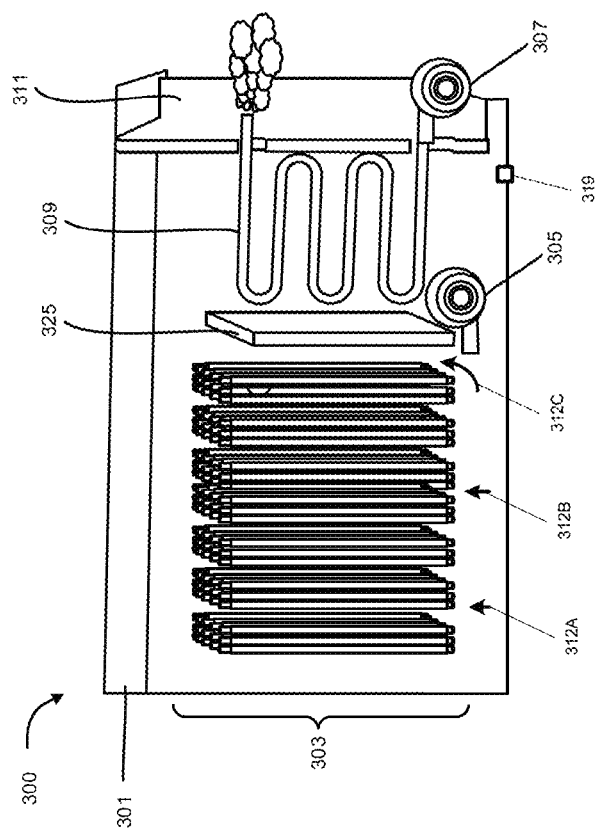
FIG. 3 illustrates a schematic diagram of a storage-fired once-through steam generator (OTSG) according to the example implementations.

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319 and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water, or another fluid pumped by the water pump 307. As the hot air heats up the water in the conduit, steam is generated at 311. The cooled air that has crossed the conduit (and transferred heat to the water flowing through it) is then fed back into the brick heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design infeasible.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
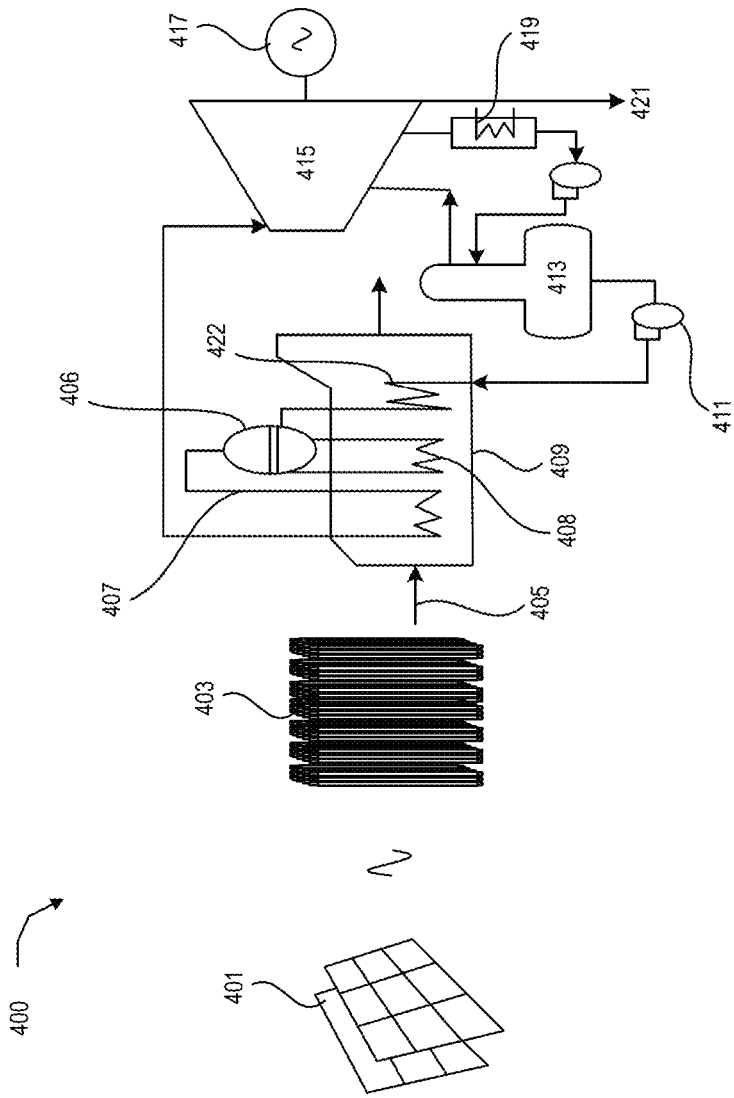
FIG. 4 illustrates an example view of a system being used as an integrated cogeneration system according to the example implementations.

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 4, lines containing a fluid, in this case water, are pumped into a drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process or condensed at 419 and optionally passed through to a deaeration unit 413 and delivered to pump 411 in order to perform subsequent steam generation.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner; or an inverse temperature cascade may be employed. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g., 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g., 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
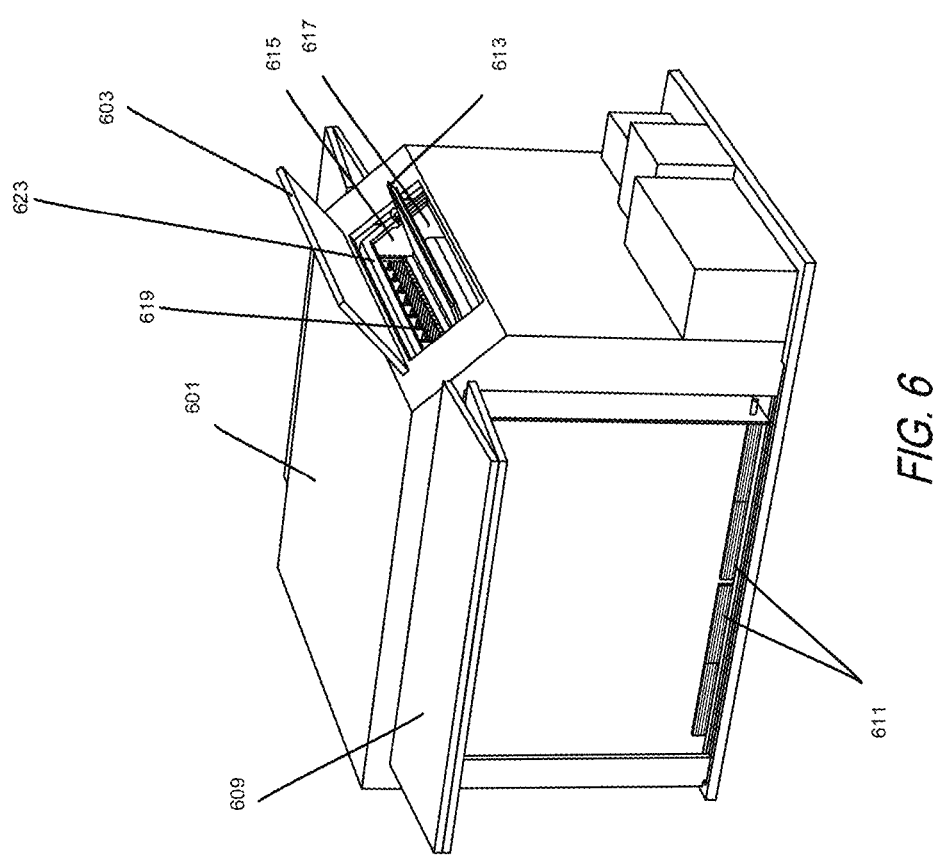
FIG. 6 provides an isometric view of the thermal storage unit with multiple vents closures open, according to some implementations.

In an OTSG implementation, a first end of the conduit can be fluidically coupled to a water source. The system may provide for inflow of the fluids from the water source into a first end of the conduit and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

Figure 5:
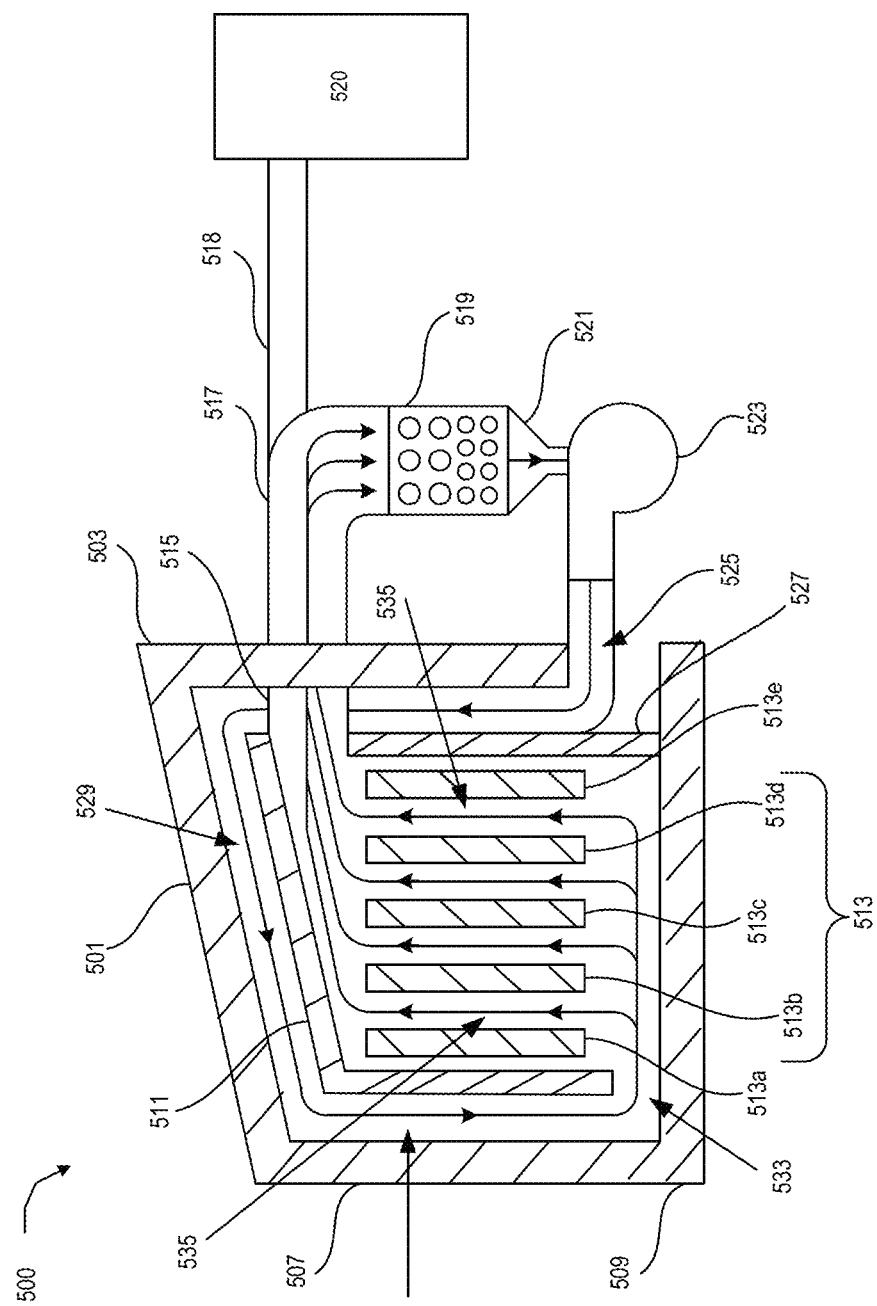
FIG. 5 illustrates dynamic insulation according to the example implementations.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of bricks in stack 513, the columns being represented as 513a, 513b, 513c, 513d and 513e. The heated fluid that is discharged from the upper portion of the columns of bricks 513a, 513b, 513c, 513d and 513e exits by way of an output 515, which is connected to a duct 517. Duct 517 provides the heated fluid as an input to a steam generator 519. Once the heated fluid has passed through steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of bricks 513a, 513b, 513c, 513d and 513e and the air passages 535 are shown schematically in FIG. 5. The physical structure of the stacks and air flow passages therethrough in embodiments described herein is more complex, leading to advantages.

In some implementations, to reduce or minimize the total energy loss, the layer of insulation 511 is a high-temperature primary insulation that surrounds the columns 513a, 513b, 513c, 513d and 513e within the housing. Outer layers of lower-cost insulation may also be provided. The primary insulation may be made of thermally insulating materials selected from any combination of refractory bricks, alumina fiber, ceramic fiber, and fiberglass or any other material that might be apparent to a person of ordinary skill in the art. The amount of insulation required to achieve low losses may be large, given the high temperature differences between the storage media and the environment. To reduce energy losses and insulation costs, conduits are arranged to direct returning, cooler fluid from the HRSG along the outside of a primary insulation layer before it flows into the storage core for reheating.

The cooler plenum, including passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the bricks 513a, 513b, 513c, 513d and 513e within the housing so that the bricks 513a, 513b, 513c, 513d and 513e are not in contact with the outer surface 501, 503, 507 of the housing, and are thus thermally isolated from the housing by the primary insulation formed by the layer of cool fluid. The bricks 513a, 513b, 513c, 513d and 513e may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the bricks, which restricts the dissipation of thermal energy being generated by the heating elements and/or stored by the bricks into the outside environment or the housing, and preheats the fluid. As a result, the controlled flow of cold fluid by the fluid blowing units of the system may facilitate controlled transfer of thermal energy from the bricks to the conduit, and also facilitates dynamic thermal insulation, thereby making the system efficient and economical.

In another example implementation, the buoyancy of fluid can enable an unassisted flow of the cold fluid around the bricks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility, and may be operationally used for control decisions of that facility, such as for detection of icing on wind turbines. Another source is weather information from sources covering a wider area, such as radar or other weather stations, which may be fed into databases accessible by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat necessary to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in embodiments for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Bricks and Heating Elements

A. Problems Solved by One or More Disclosed Embodiments

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the bricks.

B. Example Solutions Disclosed Herein

In some implementations, thermal storage blocks (e.g., bricks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers, but are not directly open to the heating element. The stack of bricks may be used alone or in combination with other stacks of bricks to form the thermal storage unit, and one or more thermal storage units may be used together in the thermal energy storage system. As the fluid blower circulates the fluid through the structure during charge and discharge as explained above, a thermocline may be formed in a substantially vertical direction. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid media system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats brick material with high heater power loading, low and uniform exposed surface temperature, and long-distance heat transfer within the storage media array via multi-step thermal radiation.

Innovative structures according to the present disclosure may comprise an array of bricks that form chambers. The bricks have structured air passages, such that in the vertical direction air flows upwards in a succession of open chambers and small air passages. In some embodiments, the array of bricks with internal air passages is organized in a structure such that the outer surface of each brick within the TSU core forms a wall of a chamber in which it is exposed to radiation from other brick surfaces, as well as radiation originating from an electrical heater.

The chamber structure is created by alternating brick materials into a checkerboard-type pattern, in which each brick is surrounded on all sides by open chambers, and each open chamber has adjacent bricks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each brick within such a checkerboard structure is exposed to open chambers on all sides. Accordingly, during charging, radiant energy from multiple heating elements heats all outer surfaces of each brick, contributing to the rapid and even heating of the brick, and reducing reliance on conductive heat transfer within the brick by limiting the internal dimensions of the brick.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed brick surfaces are larger per unit of mass than in prior systems, meaning that incoming wattage per unit area is correspondingly smaller, and consequently thermal stresses due to brick internal temperature differences are lower. And critically, re-radiation of energy—radiation by hotter brick surfaces that is absorbed by cooler brick surfaces—reduces by orders of magnitude the variations in surface temperature, and consequently reduces thermal stresses in brick materials exposed to radiant heat. Thus, the radiation chamber design effectively enables heat to be delivered relatively uniformly to a large horizontally oriented surface area and enables high wattage per unit area of heater with relatively low wattage per unit area of brick.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in brick heat conductivity, or any cracks forming in a brick that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media, and localized peak heater temperatures, are reduced by a large factor compared to previous teachings.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the bricks from the bottom end of the cells to the upper end of the cells in the first section at the predefined flow rate, and then into the second section, such that the air passing through the bricks and/or heating elements of the cells at the predefined flow rate may be heated to a second predefined temperature, and may absorb and transfer the thermal energy emitted by the heating elements and/or stored by the bricks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit, to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of inner enclosure 623 and the inner surface of the outer enclosure define a fluid passageway through which fluid may be conducted actively for dynamic cooling or passively for failsafe operation.

Inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g., wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e., with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may comprise an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g., during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g., brick) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the bricks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the "cold" end. The water can change phase along the circuit and may exit as wet steam at the "hot" end. In one implementation, steam quality is calculated based on the temperature of air provided by the thermal storage structure 403, and feedwater temperatures and flow rates, and is measured based on velocity acceleration at the HRSG outlet. Embodiments implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an embodiment. Air temperature can be adjusted by recirculation/mixing, to provide inlet air temperature that does not vary with the state of charge of the bricks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various embodiments releases low-pressure steam that is condensed to a liquid by a condenser 419, and then de-aerated using a deaerator 413, and again delivered to the HRSG 409.

III. Steam Turbine Systems

Figure 7:
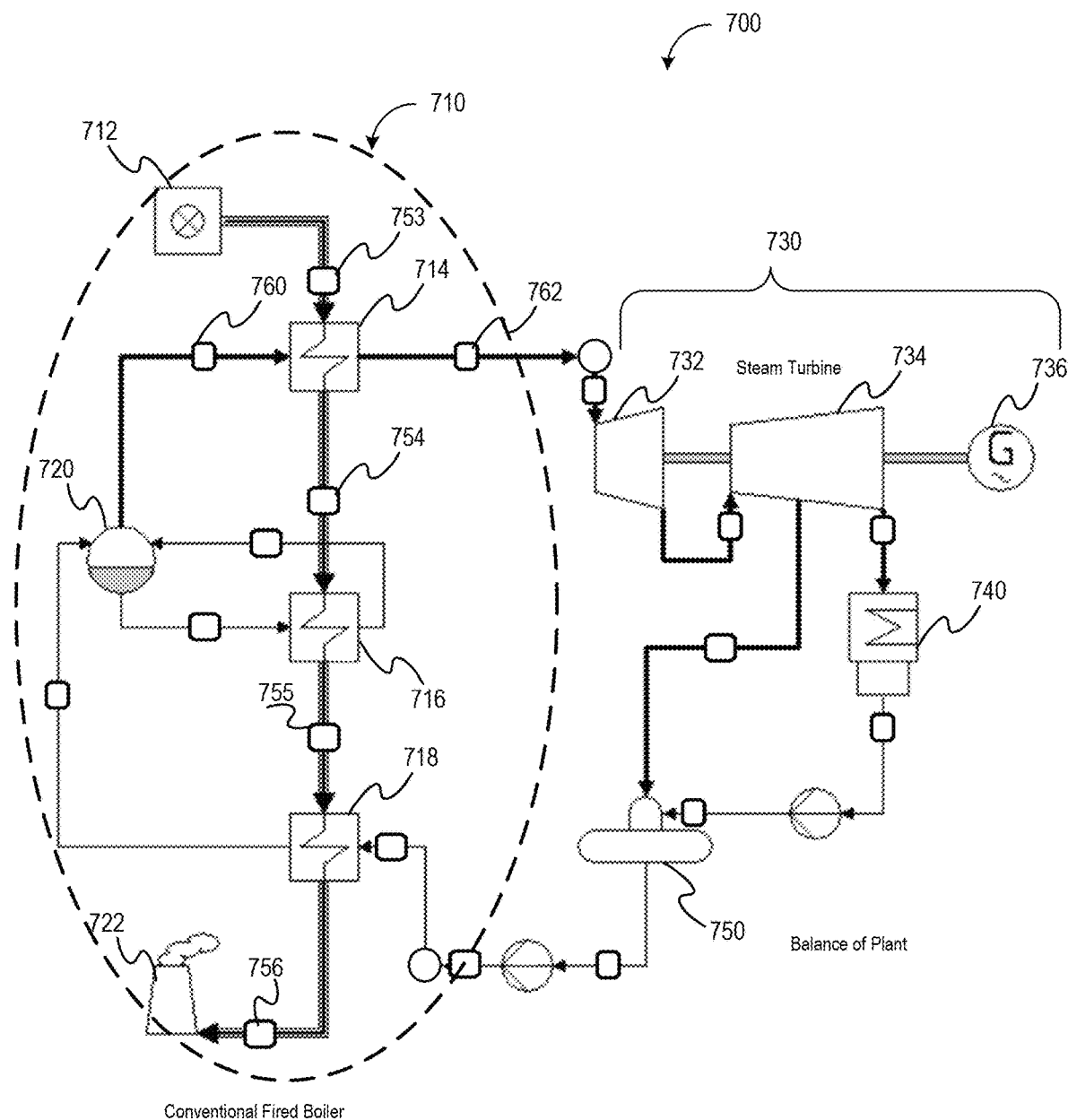
FIG. 7 illustrates a schematic of a heat recovery steam generator supplied with steam produced by a fossil fueled boiler.

FIG. 7 shows a two-stage steam turbine system 700 with a conventional two-stage (or multiple-stage) steam turbine generator 730 operating at a single pressure, without reheat, and supplied with steam from a conventional fossil fuel fired boiler 710. The boiler 710 involves a combustion chamber 712 in which a fossil fuel plus air (and/or oxygen) are combusted, and hot combustion gases are expelled to flow through various heat exchangers, 714, 716, and 718, via conduits 753-756 before the hot combustion exhaust gases are expelled to the environment up a smokestack 722. The combustion chamber 712 may be located adjacent to one of the heat exchangers such as heat exchanger 716 such that radiant heat from the combustion chamber 712 can also transfer thermal energy to the heat exchanger 716, in addition to heat being transferred by convection of hot gases blown over the heat exchangers. Heat exchanger 714 is a high-pressure steam generator that heats steam 760 from condenser tank 720 to an elevated temperature and pressure 762; the steam then enters the high-pressure stage 732 of the turbine generator 730, where the steams expands to drive the turbine as the steam while decreasing in pressure and temperature. An exhaust port from the high-pressure stage 732 then delivers steam output to a low-pressure stage 734 of the turbine generator 730, adding more rotational energy to turbine generator 730. which produces electricity in generator portion 736. The steam output from the low-pressure stage 734 is run through a condenser 740 that turns the steam to liquid water, thereby reducing the outlet pressure of steam from low-pressure stage 734 to enhance the efficiency of the overall Rankine cycle. The condensed water then travels to a deaerator 750 to remove unwanted dissolved gases before returning through the preheating heat exchangers 718 (which can function as an evaporator) and optionally also heat exchanger 716 (which can function as the high-pressure evaporator), before being superheated by heat exchanger 714 in a closed steam loop.

Figure 8:
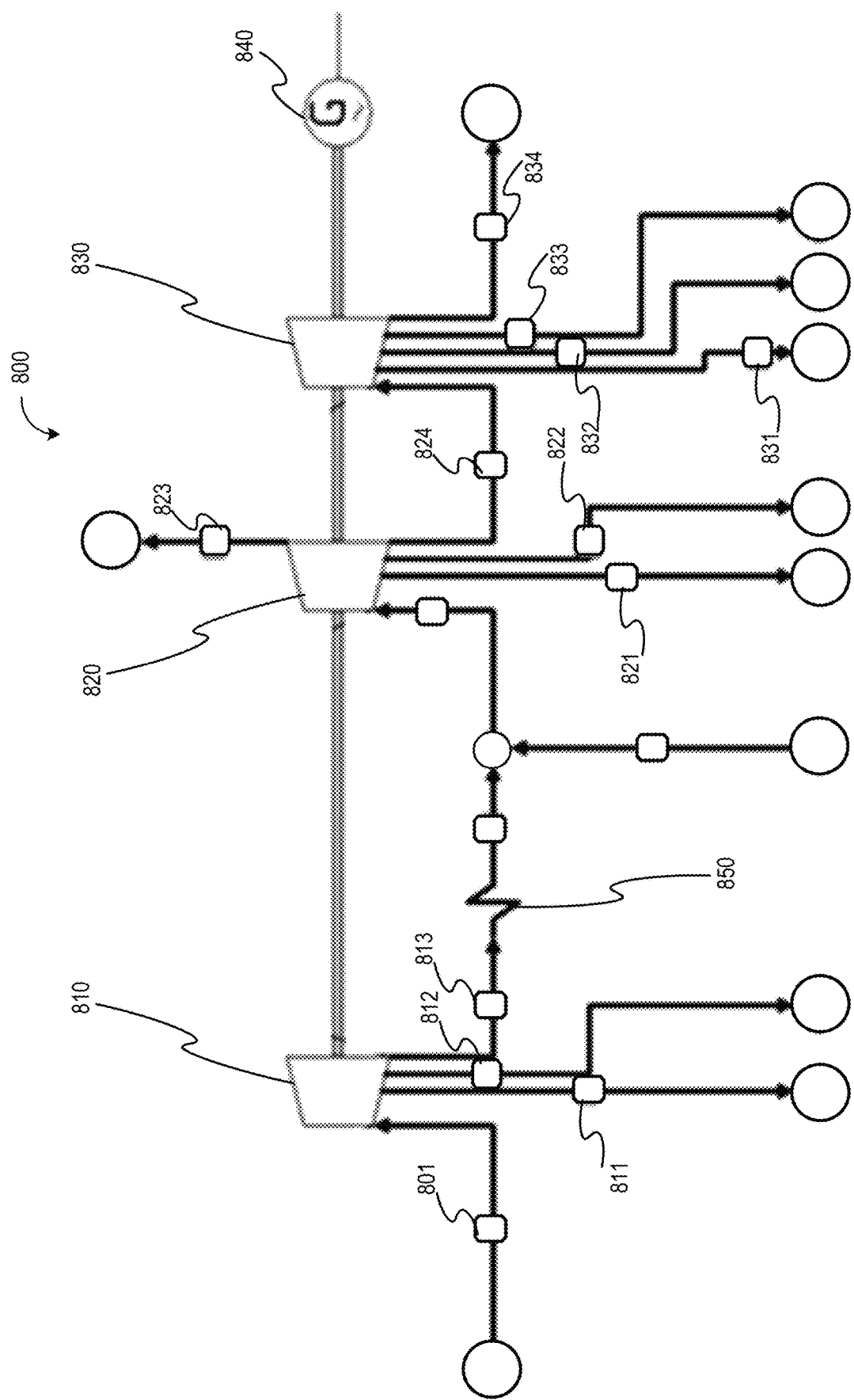
FIG. 8 illustrates a schematic of a 3-stage heat recovery steam generator showing typical operating conditions.

FIG. 8 depicts a conventional three-stage steam turbine generator 800 under typical operating conditions when supplied with energy from a fossil fuel fired boiler system. The high-pressure stage 810 receives high-pressure steam 801 which expands and drives the turbine before exiting in streams 811 and 812, which supply secondary industrial steam requirements, and stream 813, which is reheated in heat exchanger 850 before being expanded in an intermediate-pressure stage 820 of the steam turbine generator 800. Intermediate-pressure turbine stage 820 outputs steam flows 821, 822, and 823, which also supply secondary industrial steam requirements, and 824, which is in turn expanded in the third stage 830 (e.g., low-pressure stage) to further spin the turbine generator 840 to generate electricity and provide steam outputs 831, 832, 833, and 834.

IV. Thermal Energy Storage Unit Overview

The components and operation of a single thermal energy storage unit are described with respect to U.S. Pat. No. 11,603,776 and as described with respect to FIGS. 1-6, as well as variable renewable electricity and the control systems that control thermal energy storage unit components and are configured to interface the thermal energy storage unit with external equipment and systems. The lead-lag concept and disclosure, as applied to a single thermal energy storage unit containing two separate thermal brick stacks is also described with respect to U.S. Pat. No. 11,603,776. The lead-lag concept also applies fully where two or more thermal energy storage units are connected in parallel and thermally cycled on a per thermal energy storage unit basis.

IV. Thermal Energy Storage Units Powering an Exemplary Industrial Load

FIGS. 9-13 illustrate exemplary embodiments of various configurations of thermal energy storage units that process a working fluid such as a heated gas to satisfy the requirements of an industrial load that is defined by a user of the thermal energy storage (TES) system. Although exemplary embodiments focus on various thermal energy storage unit configurations, particularly for use in replacing fossil fuel fired boilers as suppliers of industrial heat, the direct application of these concepts to other industrial loads are contemplated herein. Some of the embodiments show thermal energy storage units configured to support the thermal needs of steam turbine generators, and these embodiments also have general applicability to other industrial heat and/or energy needs.

Figure 9:
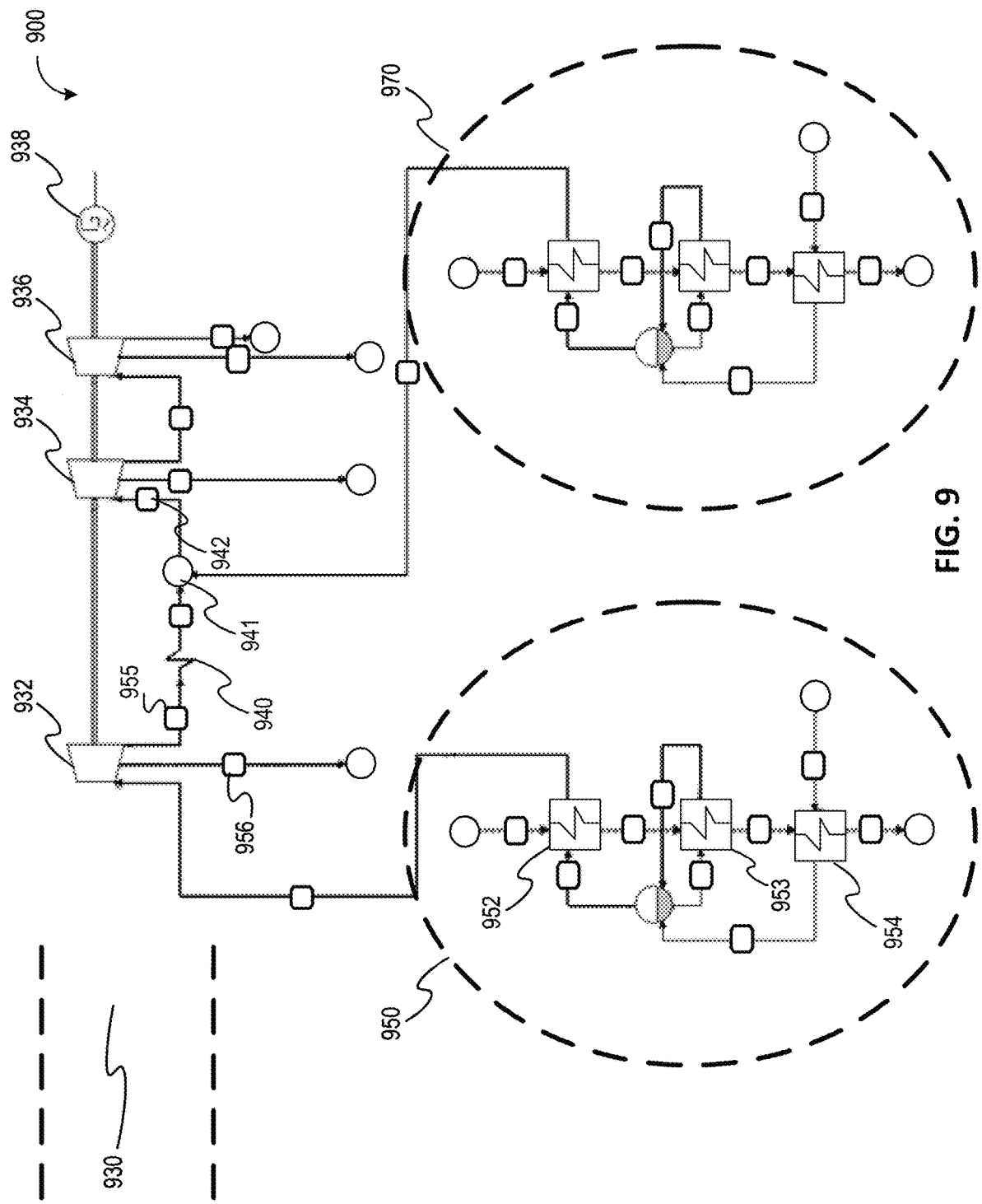
FIG. 9 illustrates a schematic of a 3-stage heat recovery steam generator supplied with steam by two thermal energy storage units, according to the example implementations.

FIG. 9 illustrates a three-stage steam turbine generator system 900 with heat supplied by two TES units. Specifically, two TES-powered boilers 950 and 970 provide steam to a steam turbine generator (STG) 930. The STG 930 is similar to the one depicted as 800 in FIG. 8, but with the high-pressure steam output and intermediate-pressure steam extraction streams eliminated (or closed off), in this case, to provide for a balanced system from both energy and mass flow perspectives. The closing of the steam extraction(s) of the STG 930 is desirable to reduce inlet water temperature to a range suitable for the TES system. In one example, the inlet water temperature can be in the range of about 80° C. to 120° C. When the high-pressure steam output and the intermediate-pressure steam output streams are removed, the amount of steam generated in the thermal energy storage unit may be reduced as appropriate to maintain the electrical generator output power under the rated maximum value for the STG 930. Alternate configurations are also possible that can also include the additional steam output streams with the addition of more thermal energy storage units in series or in parallel with one another. In this embodiment, thermal energy storage unit boiler 950 is configured to supply steam to a STG high-pressure stage 932 in stream 951. Thermal energy storage unit 950 involves an assemblage of heat blocks (aka thermal storage blocks containing structured fluid flow passageways) heated by absorbing electromagnetic radiation from heat sources such as but not limited to electroresistive heating elements. It should be understood that other configurations for integrating the TES units are not excluded.

In some embodiments, the system includes a fluid movement system configured to direct a working fluid such as but not limited to a gas through the structured fluid flow passageways to transfer heat from the heat blocks to the three heat exchangers 952, 953, and 954 in a heat exchanger portion of the thermal energy storage unit boiler 950. The hot gas exits the third heat exchanger 954 and returns to an inlet of the thermal energy storage unit in a closed loop; no smokestack is required so no pollution, greenhouse gases, or heat is expelled to the environment from this closed hot gaseous loop. Thermal energy storage unit boiler 950 is configured to supply the high temperature, high-pressure steam to the STG 930 and is expanded through the low-pressure stage 936 of the turbine to rotate the turbine to generate electricity in generator 938 before exiting the high-pressure stage 932 at a lower temperature and pressure via flows 955 and 956. While flow 956 may be used for an ancillary purpose, flow 955 flows through a heat exchanger 940 to boost its energy and is combined with an output from a second thermal energy storage unit 970 at junction 941. The second thermal energy storage unit boiler 970 is configured to output an intermediate-pressure steam that is combined in a tributary river to mainstem river fashion where either flow may be characterized as the mainstem according to the relative amount of power supplied there by each.

In this embodiment, the combined steam flow enters the intermediate-pressure stage 934 of the STG 930 as flow 942, where it is expanded, thereby adding torque to the shaft of the rotating turbine. In this mode of operation, the TES unit boilers 950 and 970 are controlled separately in tandem by the control system to produce an energy transfer that optimizes the efficiency of the STG 930. Other configurations of multiple TES units are also possible, such as one in which the steam output of the high-pressure stage of the turbine is run serially through a second TES unit boiler (not shown), rather than second TES unit boiler 970 steam output being added to the steam output of the high-pressure stage 932 (in the river/tributary fashion described above) of the STG 930 as illustrated in FIG. 9.

Other configurations are also possible in which each of the two TES unit boilers 950 and 970 are each replaced by two or more TES unit boilers connected in parallel with one another, as will be covered in greater detail in a subsequent section of this disclosure. By combining the thermal energy storage units or boilers in parallel, one thermal energy storage unit from any pair may be shut down for periodic maintenance by closing steam valves on either side of it, thereby temporarily removing it from the steam flow circuit. In this way, one of the two thermal energy storage units connected in parallel may be removed for inspection or periodic maintenance without having to disrupt the production of electricity by the STG 930. Furthermore, lead-lag cycling to prevent thermal runaway may be incorporated into the two or more thermal energy storage units connected to one another in parallel, with the thermal cycling occurring within the two sides of one thermal energy storage unit, as described in earlier portions of this application, and/or by thermally cycling on a thermal energy storage unit basis where one thermal energy storage unit cycles down in temperature while the other operates more or less at a steady state high temperature range.

Figure 10:
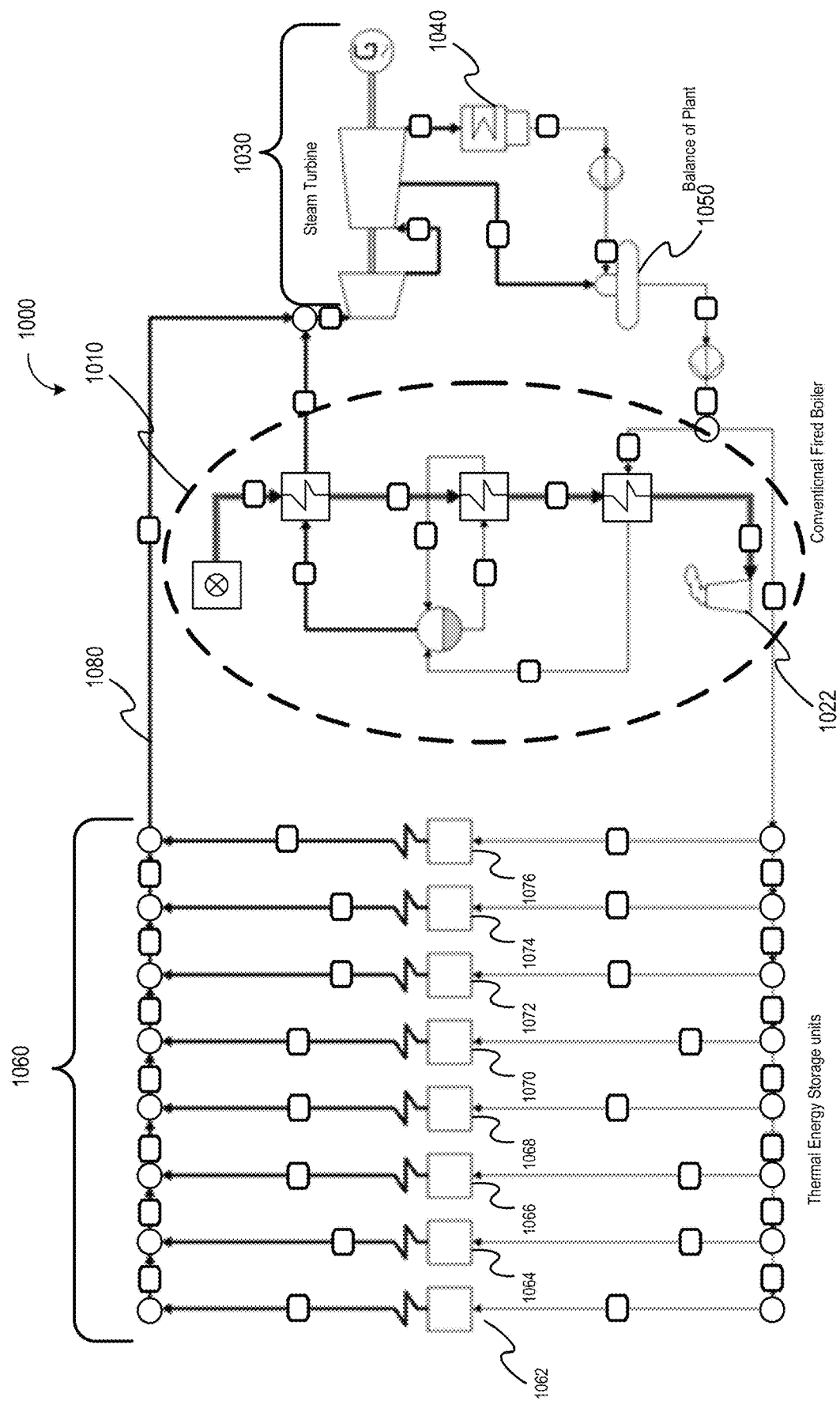
FIG. 10 illustrates a schematic of a 2-stage heat recovery steam generator supplied with steam by a fossil fueled boiler combined with multiple thermal energy storage units, according to the example implementations.

FIG. 10 illustrates a 2-stage STG system 1000 with heat supplied by a fossil fuel boiler and eight thermal energy storage units 1060 connected in parallel. Specifically, there are eight thermal energy storage unit boilers 1062-1076 connected with their high-pressure steam outputs all entering steam header 1080. Any number of thermal energy storage unit boilers may be connected in this way to meet the heat/steam/power requirements of an industrial load. In this example embodiment, the STG 1030 plus any ancillary or secondary industrial heat requirements are being supplied by steam power and are processed by the condenser 1040 and deaerator 1050. These thermal energy storage unit boilers 1062-1076 are connected to one another in parallel. A fossil fueled boiler system 1010 is also connected to the steam header 1080 in a manner whereby the fossil fuel boiler system 1010 is also in parallel with thermal energy storage units 1062-1076.

Multiple thermal energy storage units can be tied together to power a steam turbine at a maximum capacity or at a desired target capacity. The integration of the multiple thermal energy storage units can be configured to run as a single steam source, such as but not limited to running them in tandem or numerical combination as a function of the load profile to be served.

In the case of the thermal energy storage units 1062-1076, the working fluid such as a hot gas that heats steam is returned to the TES unit to be reheated rather than being wastefully expelled to the environment, as is the case with the fossil fuel fired boiler 1010 which spues the hot fossil fuel combustion products into the atmosphere through a smokestack 1022. This closed-loop flow of the working fluid in the TES units increases the overall efficiency of the system as residual heat that would otherwise be exhausted to the external environment through smokestack 1022 is instead recirculated back into to the TES unit to be heated again to an operating temperature. By connecting one or more thermal energy storage units in parallel with the fossil fuel fired boiler 1010, in combined system 1000, an existing fossil fuel based electricity generation system may be evaluated for use without the fossil fuel fired boiler 1010 in a reversible manner. After such an evaluation, the system may be used as a retrofitted fossil fuel fired boiler system to become a nonpolluting electricity generation system, with conventional boiler backup, or used as the combination system where the fossil fuel fired boiler may be temporarily shut down for periodic maintenance without having to shut down the STG, and thus continue producing electricity.

Furthermore, a bank of parallel TES units also allows for the shut down of one or more of the TES units for inspection or for periodic maintenance and/or the complete removal of the fossil fuel fired boiler system after an initial evaluation of the bank of thermal energy storage units.

Figure 11:
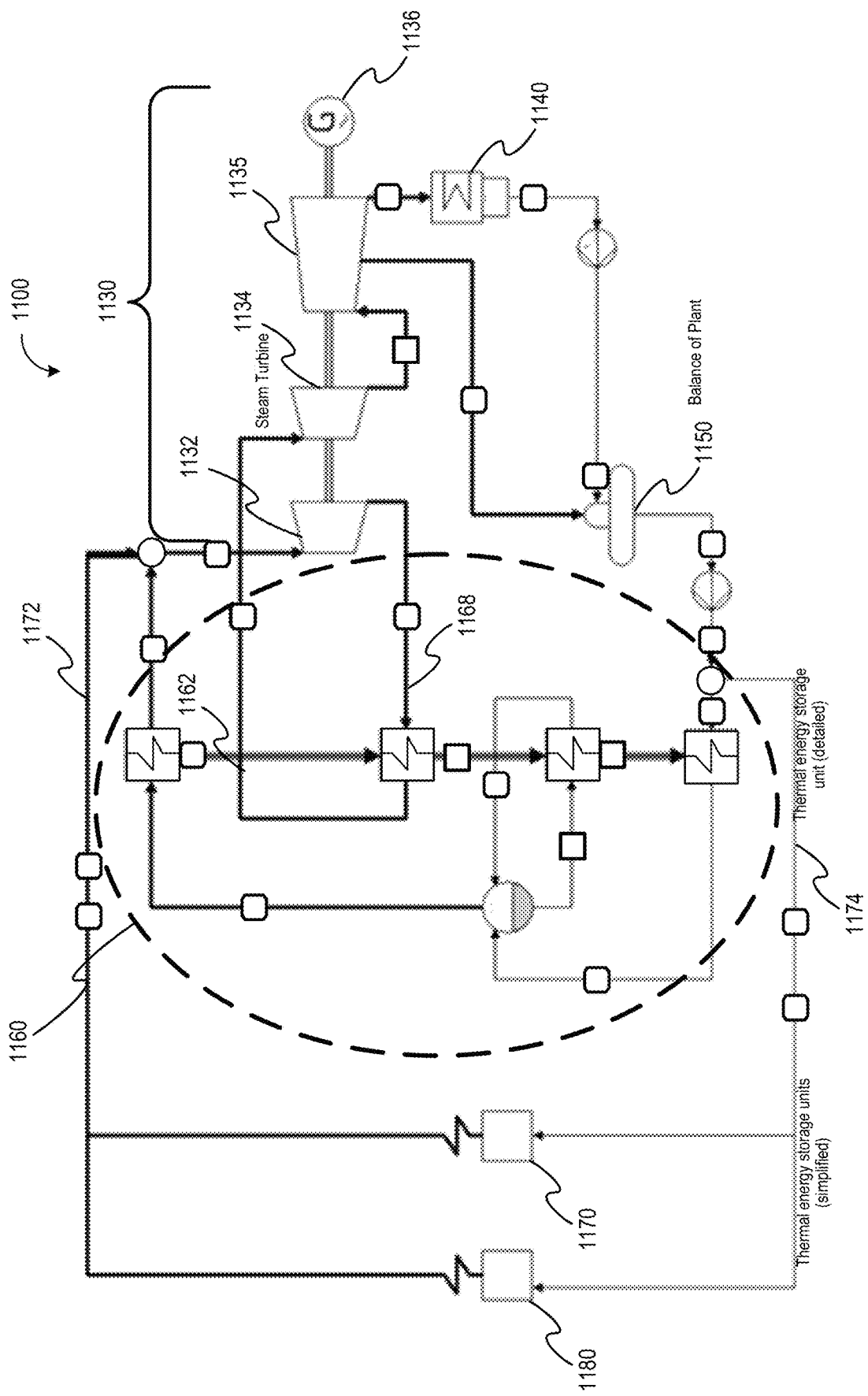
FIG. 11 illustrates a schematic of a 3-stage heat recovery steam generator supplied with steam by three thermal energy storage units, according to the example implementations.

FIG. 11 illustrates a 3-stage STG system 1100 with heat supplied by three TES unit boilers 1160, 1170, and 1180 (with thermal energy storage unit 1160 shown in a detailed schematic) connected with a three-stage steam turbine generator 1130. In this embodiment, TES unit boilers 1170 and 1180 have high-pressure steam outlets connected to high-pressure steam outlet header 1172. TES unit boiler 1160 also has a high-pressure steam outlet connected to the outlet header 1172, which provides high-pressure steam to the high-pressure stage 1132 of STG 1130. Additionally, thermal energy storage unit 1160 also has an intermediate-pressure steam outlet 1162 that delivers intermediate-pressure steam to the intermediate-pressure stage 1134 of STG 1130, which is ultimately provided to the low-pressure stage 1135 to turn the turbines of the generator 1136 and feedback via the condenser 1140 and the deaerator 1150.

In one embodiment, the thermal energy storage unit boiler 1160 can be integrated with the steam turbine generator 1130 fitted with at least two pressure levels: 1) high-pressure steam such as for a high-pressure turbine section 1132; 2) intermediate-pressure steam such as for a reheat steam turbine section 1134. Optionally, the TES unit boiler 1160 can be integrated with the steam turbine generator 1130 fitted with at least two temperature levels: 1) one for a working fluid at a first temperature for use in a high-pressure turbine section 1132; 2) one for a working fluid at a first temperature for use in a reheat steam turbine section 1134. This embodiment allows a single thermal storage unit to operate as a single boiler that provides thermal energy to working fluids at two different conditions. In one embodiment, the first temperature may be in the range of about 1000° C. to 800° C. and the second temperature may be in the range of about 800° C. to 600° C. In one embodiment, the first pressure may be in the range of about 120 bar to 80 bar and the second pressure may be in the range of about 20 bar to 10 bar.

This concept presents advantages over lower temperature thermal storage units like those using molten salt technologies because the high temperature heat source from some embodiments of the current thermal energy storage units produce superheated steam at multiple pressures (high pressure and intermediate pressure), thus increasing the efficiency of the thermal cycle.

In this embodiment, thermal energy storage units 1170 and 1180 may be sequentially subjected to lead-lag thermal cycling on a thermal energy storage unit basis, rather than, or in addition to, lead-lag as applied within separate stacks of thermal storage blocks within each thermal energy storage unit, thus providing for a constant supply of steam for an industrial load, such as the turbine generator 1130.

Figure 12:
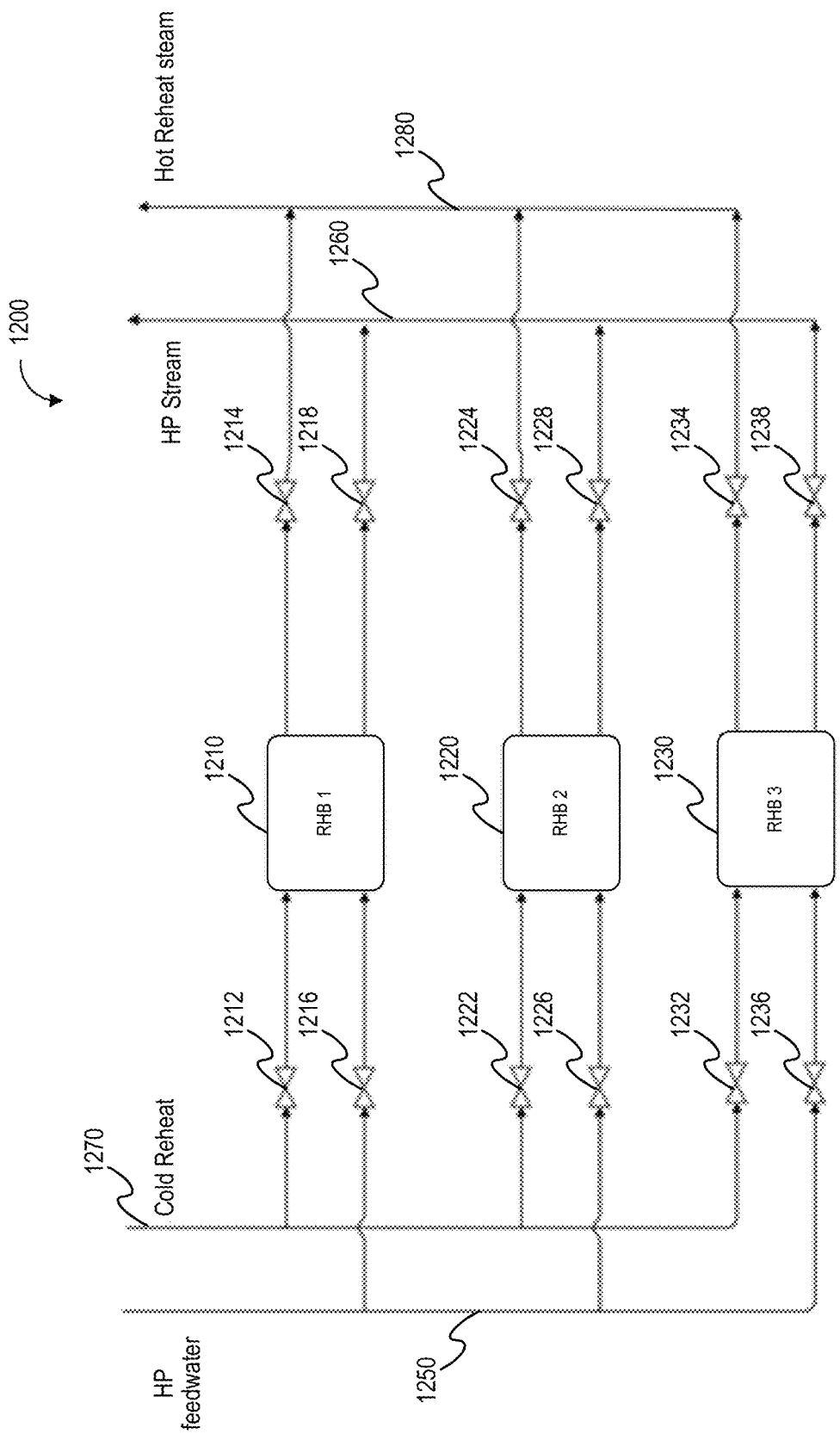
FIG. 12 illustrates a schematic of a flow of two separate steam circuits through three thermal energy storage units connected in parallel, according to the example implementations.

In many embodiments, it is desirable to have the multiple TES units configured so that both high-pressure and intermediate-pressure steam circuits are provided from each thermal energy storage unit to an industrial load, such as a STG. FIG. 12 shows such a dual steam loop supply parallel configuration of TES unit boilers 1210, 1220, and 1230. Similarly, multiple steam and/or hot gas supply lines may be run from multiple thermal energy storage units in parallel (or in series) with one another, depending upon the heat demands of industrial equipment to which the thermal energy storage units will be fluidically connected. The embodiment shown in FIG. 12 is similar to that shown in FIG. 11, except that an intermediate-pressure steam loop includes an intermediate-pressure steam header 1280 (also called a hot reheat steam header 1280) that supplies a combined intermediate steam pressure steam flow to the intermediate-pressure stage (see, for example intermediate-pressure stage 1134 of FIG. 11) of a STG. Also shown is the high-pressure steam header 1260, as well as a high-pressure feedwater header 1250 and a cold reheat header 1270. As previously mentioned, the high-pressure feedwater header 1250 delivers high-pressure steam to the high-pressure stage (see high-pressure stage 1132 of FIG. 11 for reference) of the STG. High-pressure feedwater header 1250 is shown as the high-pressure feedwater header 1174 in FIG. 11 for reference; cold reheat header 1270 may be conceptualized as cold reheat steam line 1168 in FIG. 11 but extended between similar heat exchanger elements within thermal energy storage units 1210, 1220, and 1230. Similarly, the intermediate-pressure steam header (hot reheat steam header) 1280, may be conceptualized as intermediate-pressure steam line 1162 in FIG. 11, may be extended between like components within thermal energy storage units 1210, 1220, and 1230. Other similar interconnected steam loops to other thermal energy storage unit heat exchangers can also be used in accordance with the desired implementation, and the present embodiment can be modified accordingly to fit the desired implementation.

FIG. 12 also shows that any one of the thermal energy storage units may be isolated fluidically from the rest by closing valves that remove a particular thermal energy storage unit from the various steam loops. Specifically, FIG. 12 illustrates a system 1200 involving three thermal energy storage units in parallel with shut-offs for each. For example, to remove thermal energy storage unit 1210 from the two exemplary steam loops discussed above, the upstream cold reheat valve 1212, 1222, 1232, the upstream high-pressure feedwater valve 1216, 1226, 1236, the downstream hot reheat valve 1214, 1224, 1234, and the downstream high-pressure steam valve 1218, 1228, 1238 would be shut off. In this manner, any one or multiple TES units may be taken offline for inspection and/or maintenance without interrupting the continuous supply of steam to an industrial load such as to run a STG to generate continuous electrical power. Any number of configurations are contemplated, depending upon the requirements of the industrial application.

Furthermore, a control system can be configured to control not only the individual TES units, but also the performance characteristics of the particular configuration or assembly of modular TES units to match the performance requirements for any particular industrial load. For example, the control system may be configured to control an output pressure, temperature, and flow rate of each thermal energy storage unit to achieve a combined output pressure, temperature, and flow rate of the assembly of thermal energy storage units. These combined parameters may be calculated and/or measured with sensors that interface with the control system. In addition, the combined output pressure, temperature, and flow rate may be controlled to meet specification requirements of an industrial heat load, for example the operation of the multiple thermal energy storage units may be controlled to achieve an output pressure, an output temperature and/or an output mass (or volumetric) flow rate that match the specification defined by any particular industrial load. In the fossil fuel fired boiler configuration, it is desirable for the combined TES unit steam output match the outlet pressure of the fossil fuel fired steam boiler, with the matching of the outlet temperature and flow rate being of secondary concern.

Furthermore, the previously mentioned concepts of lead-lag cycling to a deep-discharge temperature region may be extended to any number of thermal energy storage units, such as the three connected in parallel as shown in FIG. 12, where the leading and lagging may be configured to occur, for example, over the three thermal energy storage units, where the cycles are offset from one another by 120 degrees, conceptually, or ⅓ of the total cycle time from one another, somewhat analogous to three phase power in an electrical circuit. In general terms, the offset would be the total cycle time divided by the number of units, N. Extension of these concepts to other industrially important heat loads such as SOEC, SOFC, calcining, ethylene cracking, cogeneration, steelmaking, smelting, materials activating, most any high-temperature process to enable favorable reaction thermodynamics or kinetics of an industrial process, and other industrial heat loads as described herein are contemplated and solved by such a control system.

Figure 13:
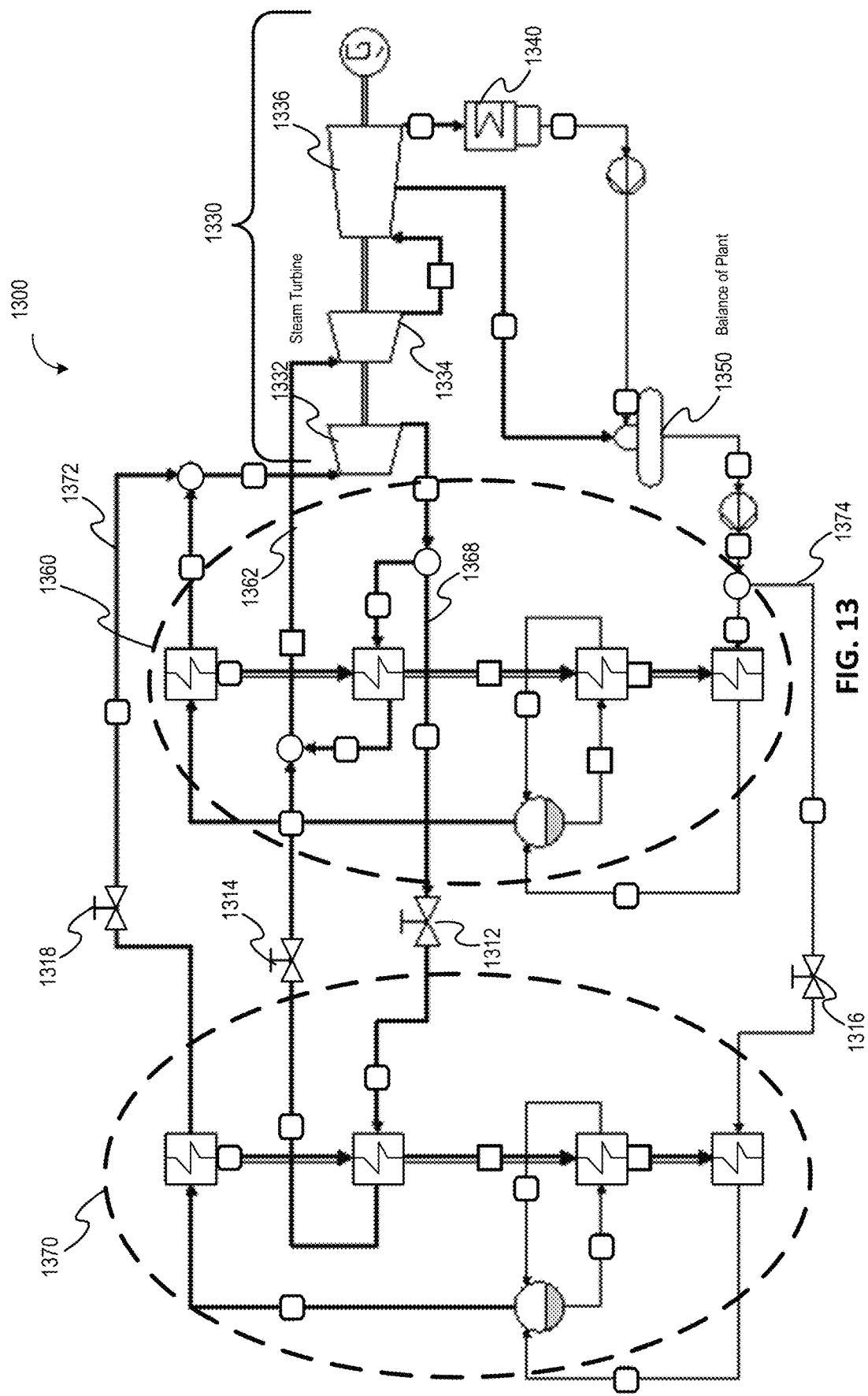
FIG. 13 illustrates a schematic of a 3-stage heat recovery steam generator supplied by steam from two thermal energy storage units connected in parallel, according to the example implementations.

FIG. 13 illustrates an example of a 3-stage STG system 1300 with heat supplied by two thermal energy storage units. Specifically, there is shown an embodiment of a system 1300, including two thermal energy storage units, 1360 and 1370 fluidly connected to an industrial load, in this case, a three stage STG 1330. FIG. 13 shows such a dual steam loop supply configuration using thermal energy storage units 1360 and 1370 in a parallel configuration. In general, multiple steam and/or hot gas supply lines may be run from multiple thermal energy storage units connected in parallel and/or in series with one another, depending upon the specific heat/steam/power demands of industrial equipment or industrial loads to which the thermal energy storage units will be fluidically connected. The embodiment shown in FIG. 13 has both an intermediate-pressure steam loop that includes an intermediate-pressure steam header 1362 (also called a hot reheat steam header 1362) that supplies a combined intermediate steam pressure steam flow to an intermediate-pressure industrial load, for example the intermediate-pressure stage 1334 of a STG 1330, which is eventually provided to the low-pressure stage 1336 to turn a turbine of the generator, and then is fed back via the condenser 1340 and deaerator 1350.

Also shown is a high-pressure steam header 1372, as well as a high-pressure feedwater header 1374 and a cold reheat header 1368. The high-pressure steam header 1372 delivers high-pressure steam to a high-pressure industrial load, for example, a high-pressure stage 1332 of the STG 1330.

Other similar steam loops to other thermal energy storage unit heat exchangers are similarly contemplated with any number of thermal energy storage units. FIG. 13 also shows that any one of the thermal energy storage units may be isolated fluidically from the rest by closing valves that remove a particular thermal energy storage unit from the various steam loops. For example, to remove thermal energy storage unit 1370 from the two exemplary steam loops discussed above, the upstream cold reheat valve 1312, the upstream high-pressure feedwater valve 1316, the downstream hot reheat valve 1314, and the downstream high-pressure steam valve 1318 would be closed. In this manner, multiple thermal energy storage units may be taken offline for inspection and/or maintenance without interrupting the supply of steam to an industrial load such as to run a STG to generate continuous electrical power as shown in FIG. 13.

Any number of configurations are possible and can be readily tailored using this modular approach to match the specific requirements of any particular industrial load application to facilitate the desired implementation. Furthermore, an overall control system may be provided that controls both the individual thermal energy storage units and also the performance characteristics of the particular configuration or assembly of modular thermal energy storage units, to match the performance requirements for any particular industrial load. For example, such a control system may be configured to control an output pressure, temperature, and flow rate of each thermal energy storage unit to achieve a combined output pressure, temperature, and flow rate of the assembly of thermal energy storage units, where the combined output pressure, the combined output temperature, and/or the combined output flow rate are configured to fall within a industrial load target pressure range, industrial load target temperature range, and/or industrial load target flow rate range. In this way, the combined output pressure, combined output temperature, and combined output flow rate may be controlled by the overall controller to fall within industrial load specification target requirement ranges of an industrial heat/steam/power load, for example an output pressure and temperature of a conventional fossil fuel fired boiler.

Additionally, a combined output steam power may be determined within the controller and be controlled by feed forward or feedback control to fall within a specified industrial target steam power range. Likewise, in heat delivery applications, a combined heat output may be controlled similarly to fall within a specified industrial target heat power range (Btu/hr or kW).

Furthermore, the concepts of lead-lag cycling may be extended to any number of thermal energy storage units, with the thermal cycling of any particular thermal energy storage unit controlled by the overall controller to coordinate with the thermal cycling of the other thermal energy storage units in any manner appropriate, based on factors such as the availability of other units to handle the heat/steam/power requirements, a measured temperature profile or an analyzed infrared thermal image such as that from a forward-looking infrared (FLIR) array, a pressure drop across a longitudinal or lateral portion of each stack of bricks, and the like to prevent thermal runaway within the thermal storage assemblages of heat blocks in any of the combined thermal energy storage units.

Additionally, the control system may control fluid flow rates internal to and external to each of the one or more thermal energy storage units, the amount and rate of change of electricity supplied to each of the heating elements within each thermal block assemblage, as well as a startup sequencing and ramping operations, and a shutdown sequencing and ramping down of operation for each of the one or more thermal energy storage units both individually and in concert with one another.

Another possible system of thermal energy storage units fluidly connected in parallel by the steam flow header includes a first bank of one or more thermal energy storage units configured to output high-temperature/high-pressure steam to a high-pressure steam load, for example an inlet of the multistage reheat steam turbine, and a second bank of one or more thermal energy storage units configured to output intermediate-pressure steam to another industrial load, for example an intermediate-pressure steam inlet of the multistage reheat turbine. In the context of the multistage reheat steam turbine, the second bank of thermal energy storage units may be configured to receive outlet steam from the high-pressure stage of the turbine and increase an energy density of the outlet steam and supply the outlet steam to the intermediate-pressure steam inlet of the multistage reheat turbine (not shown).

Extension of these concepts, given here within the context of replacing a fossil fuel fired boiler system that supplies an hourly tonnage of steam to drive a turbine generator, to other industrially important heat/steam/power loads such as SOEC, calcining, ethylene cracking, cogeneration, steelmaking, smelting, materials activating, and other industrial heat loads as described herein, as well as others, are contemplated and solved by this modular thermal energy storage unit in its many configurations, controlled by an overall control system.

V. Other Industrial Applications of Thermal Energy Storage Units

Figure 14:
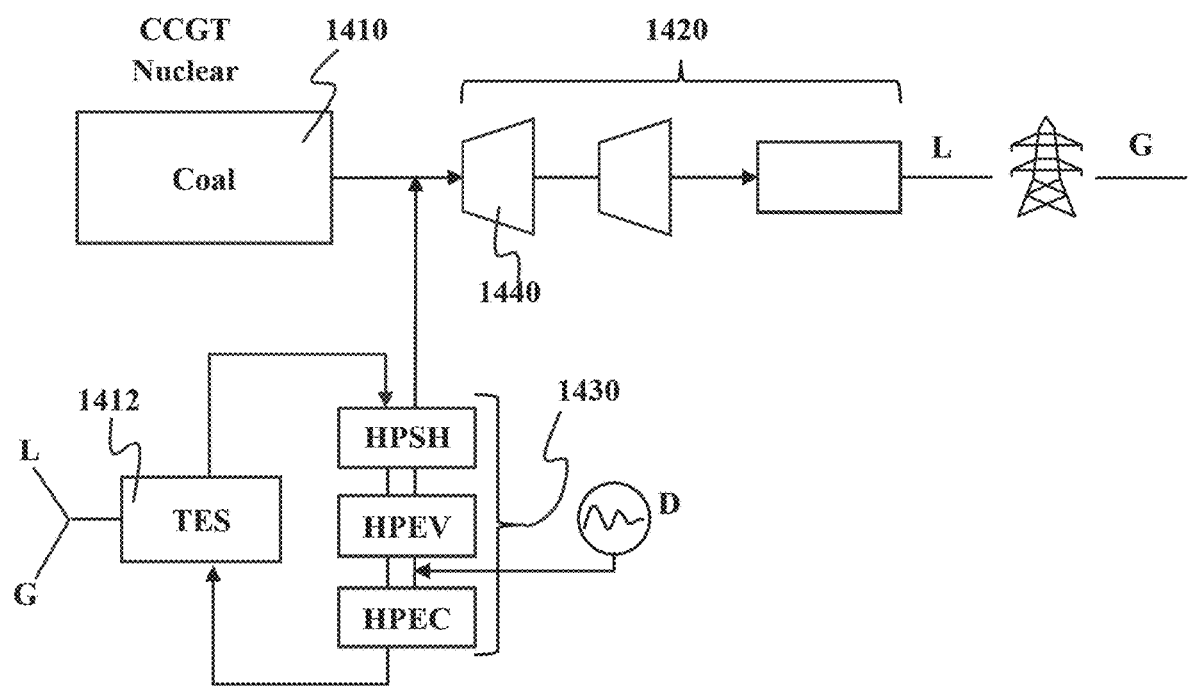
FIG. 14 illustrates a schematic diagram of a system according to the example implementations.
Figure 24:
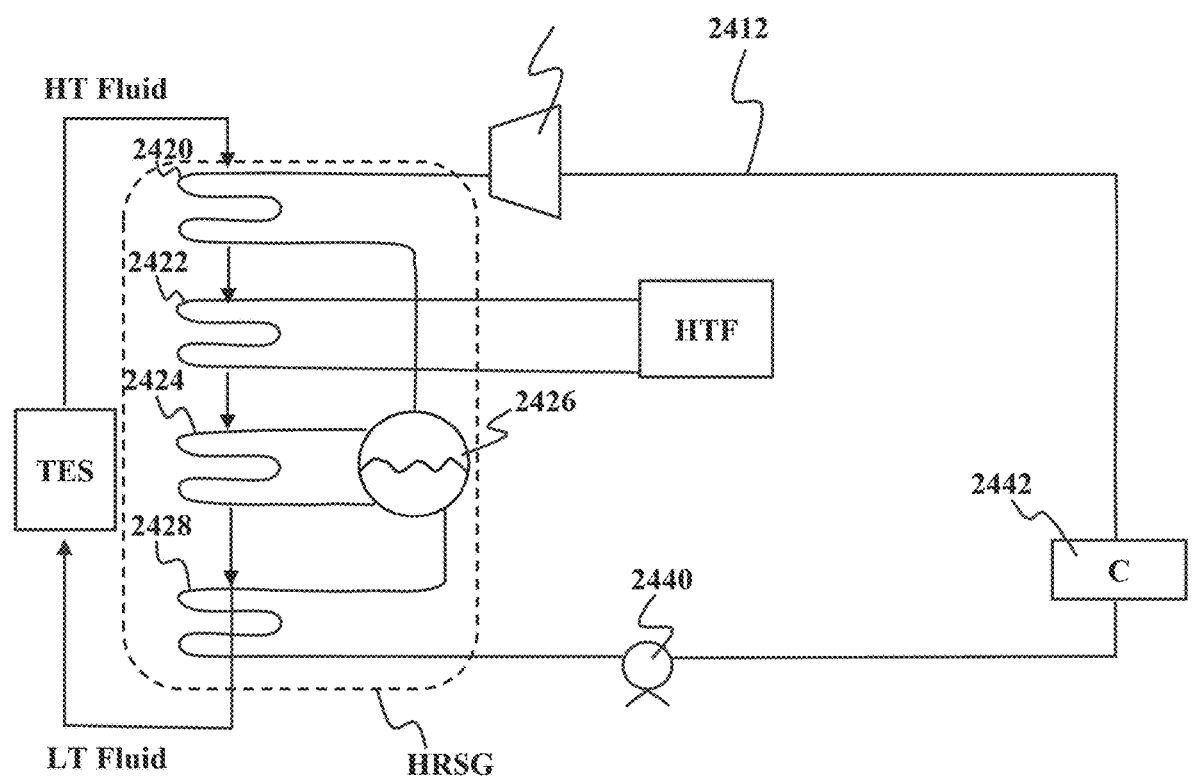
FIG. 24 illustrates a schematic diagram of a system according to the example implementations.

FIG. 14 depicts a coal-fired boiler 1410 with a TES unit 1412. A fossil boiler such as coal-fired boiler 1410 may be combined with the TES unit to power a multi-stage turbine steam generator (STG) 1420 with no reheat. Optionally, some embodiments of the STG 1420 may have a turbine with reheat forming a heat recovery steam generator (HRSG). Optionally, as shown in FIG. 24, a single turbine can be powered by a TES along with a heat exchanger for another industrial use.

A thermal cascade 1430 is provided, including heat exchangers for high-pressure superheat using a high-pressure superheater (HPSH) with a high-pressure evaporator (HPEV) and a high-pressure economizer (HPEC), along with a drum D that is connected to the high-pressure evaporator HPEV. The TES unit 1412 heats a working fluid such as but not limited to air, molten salt, or another fluid that powers this recirculating superheating boiler from thermal storage. The working fluid may be directed over the heat exchangers to thermally interact with any gas or liquid being carried inside the heat exchangers. This combination of power plant plus thermal storage unit 1412 and the coal-fired boiler 1410 provides a hybrid system with improved efficiency. The superheated steam output from a steam generator of the thermal storage unit 1412 and the coal-fired boiler 1410 is preferably at the same pressure and temperature, creating a combined superheated input to the first turbine section 1440. The TES unit can be fed by the local source L and/or the grid G. The source of electricity for heating the TES unit may be the electrical grid G and/or a local source L such as, but not limited to, solar panels, wind turbines, or the like.

Figure 15:
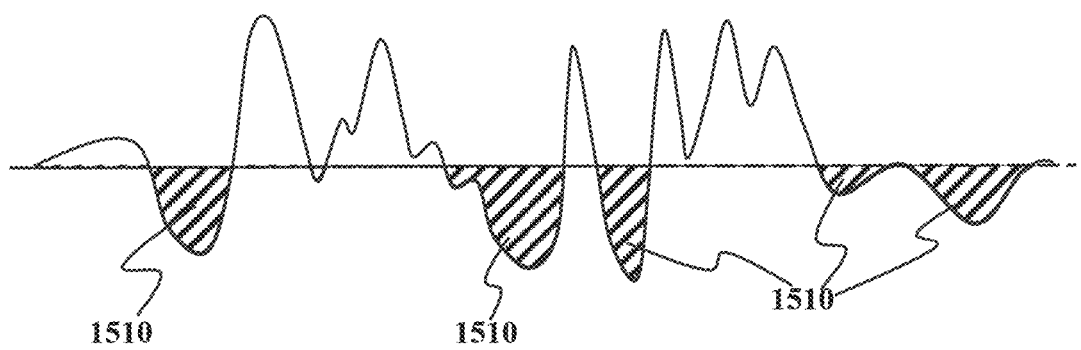
FIG. 15 illustrates a chart showing price of energy over a period of time.

FIG. 15 illustrates price fluctuations (on the vertical axis) over time (on the horizontal axis), in which prices sometimes climb to high levels, and sometimes go negative as indicated by cross-hatched areas 1510. A coal-fired plant may be required to operate even when prices for the power it generates are negative or below some threshold set by the plant operator. There is some price of electricity that corresponds to the price of burning coal. One could decide, for example, that an algorithm for the hybrid power plant is to run the charging circuits for the TES unit anytime electricity is below the price of burning coal, so that a method of charging is responsive to curtailment, possibly grid congestion, price, weather, or other predetermined criteria. Another method of charging the TES unit may be to always charge the unit when the price per MWh is below a threshold; that threshold might be a price zero, or it might be set at a different (positive or negative) price level. By tracking the pricing, an operator (and a control system) can determine when to sell electricity created by its fossil fueled plant and when to not sell, but instead store that electrical energy in the form of heat in the TES unit. This stored thermal energy can be used to at a later time, when demand and prices are higher and it is functionally (due to the higher demand) and economically advantageous to sell that energy.

Safety

Referring back to FIG. 14, methods of discharging the hybrid system are also described, which may vary based on the type of conventional power plant being combined with the TES. In one operation the coal-fired boiler may be in operation essentially continuously at a high level, while in other operations the coal-fired boiler may be turned down to a low operational level. In some embodiments, instead of a coal-fired boiler, the steam source 1410 could be another type of source such as a nuclear power plant. The output of a nuclear reactor cannot generally be adjusted very much (e.g. powered down), and as a result nuclear reactors conventionally operate even when there are negative wholesale electrical prices. Because of this, the discharge technique for use with a nuclear reactor may be different than those of other conventional power plants.

Figure 16:
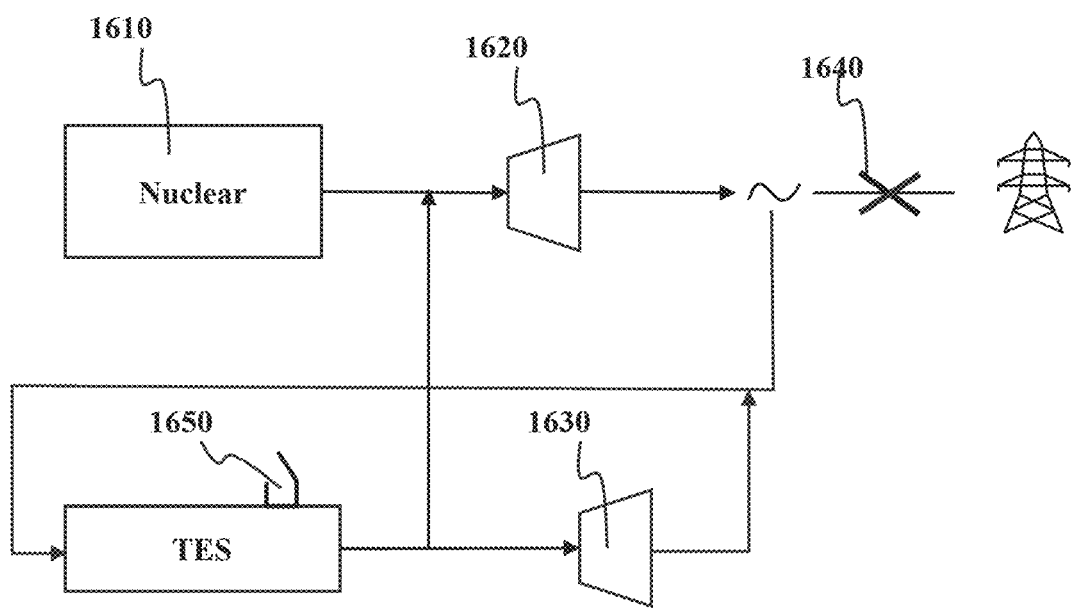
FIG. 16 illustrates a schematic diagram of a system according to the example implementations.

Referring now to FIG. 16, in embodiments using a nuclear reactor power plant 1610, the TES can charge locally from a local generator or combined with grid power, and then power either the same turbine 1620 as the nuclear reactor or an alternate turbine 1630. Optionally, the nuclear reactor with its steam turbine generator powers electrical heaters of a TES unit that feeds steam to turbine 1620 or feeds steam to a new turbine 1630.

Combining a nuclear reactor power plant with one or more TES units can improve nuclear power plant safety. This is particularly beneficial for when the electricity grid coupled to the nuclear power plant goes "black" or offline as indicated at 1640 (the "X"). A grid blackout can lead to a steam turbine quickly needing to "trip" or go offline, in which case the nuclear reactor may need to scram, i.e. rapidly shut down of to stop the fission reaction, usually by rapid insertion of control rods, either automatically or under manual control by the reactor operator. This rapid shutdown of a reactor is highly undesirable. To avoid this, one or more TES units may be charged by receiving the reactor's electrical output that would have gone to the electrical grid, but cannot due to the electrical grid being offline, and storing that electrical output as heat. By providing a heat battery to absorb the electrical output in this manner, sufficient time is provided for nuclear power plant operators to perform a normal slow reactor shutdown if needed, avoiding a scram—or to simply continue charging connected TES units as needed until the grid is again available. Sufficient charging capacity of the TES unit(s) may be provided to absorb the entire electrical load output from the nuclear reactor's steam turbine(s).

The TES units can be configured to isolate themselves from the grid. The nuclear reactor's steam turbine 1620 will in this situation direct all the electricity generated by the reactor's steam turbine(s) into the TES units. One can use that energy going to the TES unit to do a normal slow shutdown, and store that energy to use at a later time. In one non-limiting example, this stored energy can be used to "black start" the reactor or just generate electricity for the grid.

An alternate turbine 1630 may be provided to allow for variety of other applications, such as but not limited to a black start of a nuclear reactor. Conventionally, large banks of diesel generators are fired up to run the reactor pumps in order to allow the reactor to make steam in order to roll the turbine associated with the reactor. Instead of big banks of diesel generators to power reactors pumps, a TES unit may be maintained in a charged state and/or charged as needed during the outage, to provide the black-start capability for the reactor and improve reactor safety.

A typical reactor might have, e.g., a 1000 MW steam turbine. In this case, multiple TES units may be required to provide sufficient peak charging rate to absorb all of the 1000 MW generated from the reactor's steam turbine. The TES unit(s) can be configured to be able to accept full charge rate at all times during a safety crisis. This is not possible for other technologies (such as lithium-ion batteries). When a lithium-ion battery is at a 90% charge, it can charge only at a relatively low rate. The TES units disclosed herein, in contrast, can charge at 100% charging rate independently of the degree of charge. An additional advantage is provided by using a discharge port 1650. Charging while venting through an opened emergency discharge port 1650 allows dissipation of input power, such that full charge rate can be achieved (absorbing the turbine's full output) at any time, even if there is no immediate load receiving output from the TES unit. The ability to charge at full rate while simultaneously discharging or dissipating the input power means that at all times, regardless of the state of charge, the TES can receive full input power and thereby act as a safety asset in a way that conventional technologies cannot.

Thus, with the discharge port 1650 open and the blower on, the TES can discharge at the same rate as the maximum charge rate. Optionally, to function solely as a safety asset, some embodiments of the TES may be configured to operate without coupling the TES to a steam turbine or to any other output creating device. The TES can be used solely as an energy sink or outlet for handling all of the excess nuclear reactor power that would otherwise have nowhere else to go, thus buying time for a normal reactor shutdown or for a grid to be operational. The value of a TES unit to the nuclear reactor is both: (a) to avoid negative price, avoid congestion/curtailment, avoid providing regular "regulation" service; and (b) to provide safety during electrical grid faults, such that the TES can absorb all the power from the reactor.

Efficiency

Figure 17:
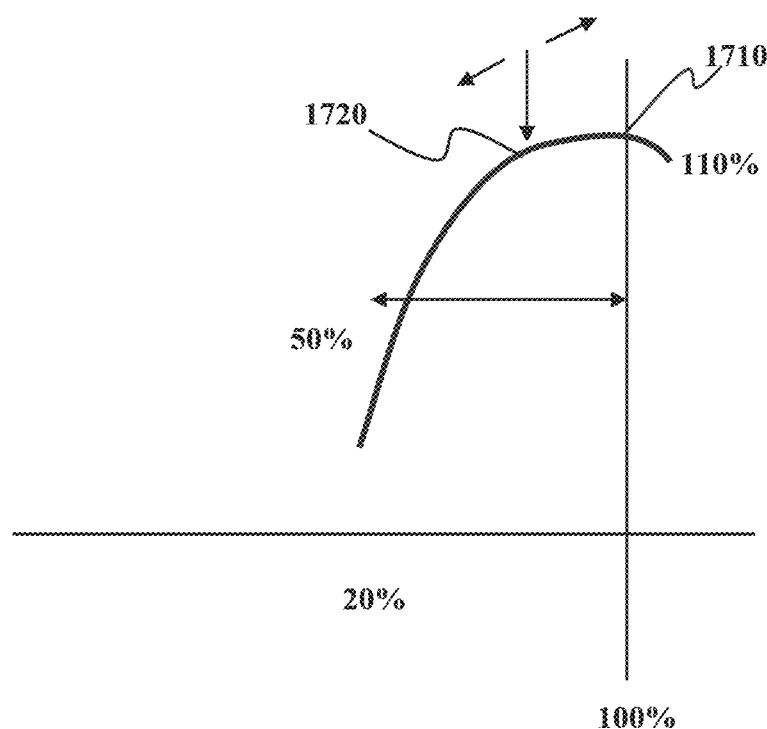
FIG. 17 illustrates a chart showing turbine efficiency relative to percentage of output power.

Referring now to FIG. 17, there are cases where power stations are required to ramp up and down to follow generation needs or to follow the requirements of a load. As seen in FIG. 17, steam turbines have a natural efficiency curve 1710 relative to turbine output percentage. In this example, the stream turbine has maximum efficiency when the turbine is at 100% output, and the turbine loses about 50% efficiency when the steam turbine is at about 20% of output. The steam turbine can be pushed to go up to 110% of rated output, and the turbine loses some efficiency as shown in the graph. It is often the case that power stations are operated at less than 100% output. Many power stations thus generally have a percentage output such as at location 1720, which is less than 100% output, so that they can ramp either up or down, as needed, on short notice. At such an output, the steam turbines are actually both producing less power than their maximal design, and moreover they are generating that power less efficiently than they would have if they were operating close to 100%, where they are more efficient.

Figure 18:
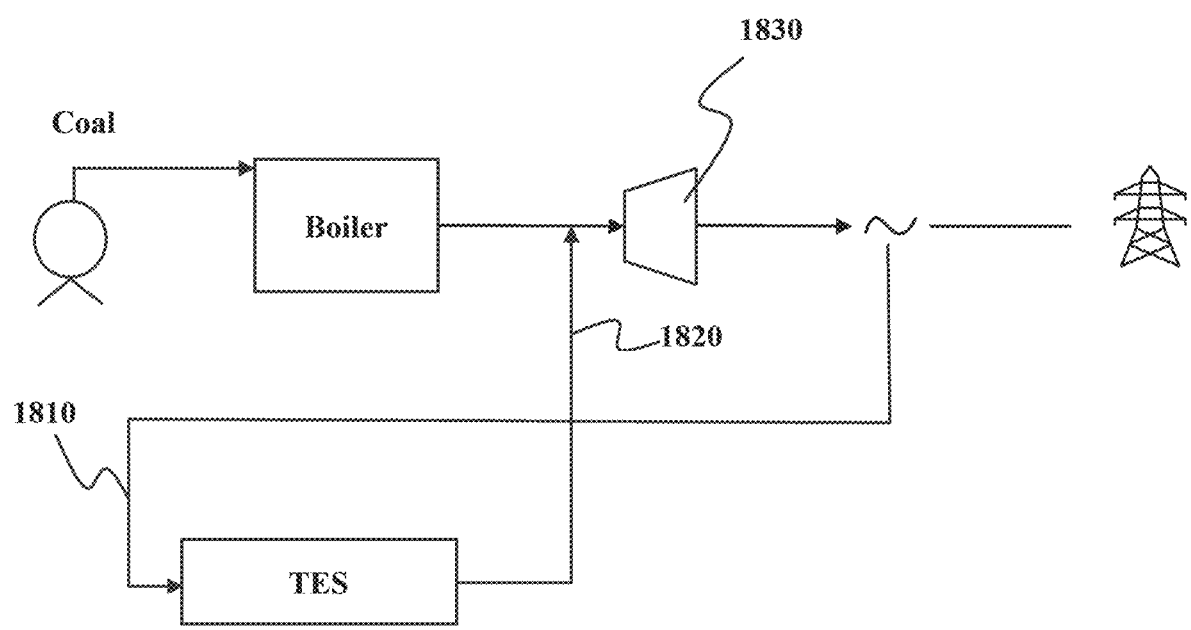
FIG. 18 illustrates a schematic diagram of a system according to the example implementations.

FIG. 18 depicts a system including a boiler, a steam turbine 1830, and an TES system which provides feeds steam 1820 to the turbine and has an electrical input coupled to electrical power output 1810 of the turbine 1830. The system can be controlled to operate during peak price periods at 100% steam turbine output; and because the system includes a TES unit, it can provide "reg" down service by charging electrical circuits to heat the TES, while still running the steam turbine at some output percentage, including at levels where the turbine is at maximum efficiency. The system can provide "reg" up by going to 110% of nominal steam turbine output, with the TES providing the additional needed steam output to the steam turbine 1830. The system can provide "reg" down capacity by taking part of the electricity generated by the steam turbine power and using that electrically to charge the TES, thus lowering the effective electrical power provided to the electrical grid and meeting the "reg" down command. In this manner, the steam turbine can be controlled to operate at or near its maximum efficiency point, and any up or down output changes can be implemented by the TES unit either (1) adding steam to the steam turbine 1830 to increase electrical output, or (2) using excess electrical output to heat the TES, instead of sending it to the electrical grid, thus complying with any "reg" down command.

Reduced Maintenance Costs

Turbine ramping causes increased operating and maintenance costs. Boiler ramping is slow, especially in a coal-fired boiler. A coal-fired boiler conventionally includes a blower that moves air, drawing in coal powder and providing for a fire in a large combustion chamber. The large size results in long times to achieve significant changes in steam rate, e.g. on the order of about 10 minutes or more, so that the power plant can only move slowly in response to commands. It is economically more valuable and desirable to be able to move the turbine power output rate up and down quickly. A TES-based system can provide rapid "reg" down by turning on electrical charging to the TES, providing time for the boiler to respond more slowly, at its normal rate, which reduces operating and maintenance costs and resulting in longer life for the boiler. This manner of using the charging circuit of the TES to provide rapid response to grid commands so that the boiler can respond more within its normal operating condition can be applied to essentially any conventional power plant. It allows the system to capture the benefit of rapidly ramping down, without incurring the penalty of increased operating and maintenance costs.

Improved Responsiveness

Figure 19:
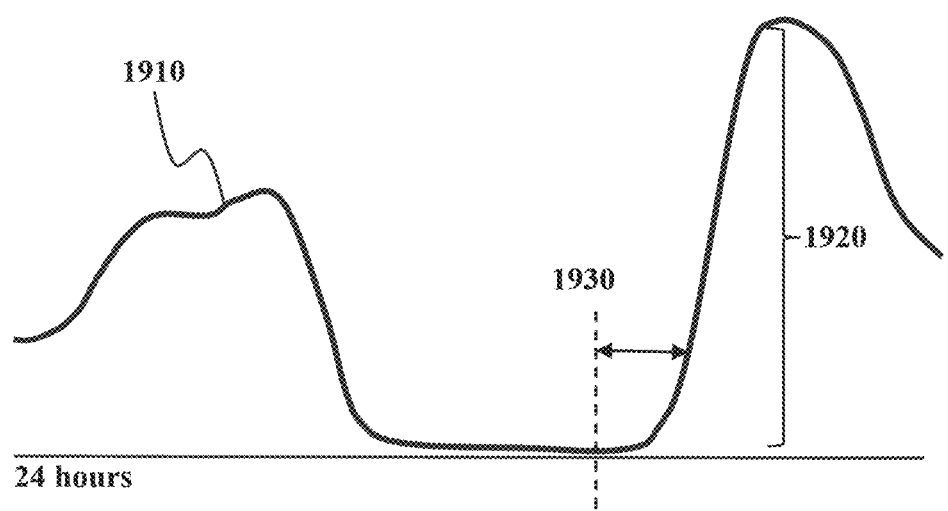
FIG. 19 illustrates a chart showing an example of electric energy demand over the course of 24 hours.

Another feature of a TES-based system is rapid responsiveness. FIG. 19 shows an example of a daily electrical power demand curve 1910 plotted over a 24-hour period. As seen, there is a desire to move power to match peak periods of high demand. In sunny regions, the electrical demand has a well-known "duck-shaped" curve with a sudden ramp 1920 starting in the late afternoon period. There is a desire for a large amount of generation capacity coming online at point 1920 in curve 1910, ramping rapidly.

Figure 20:
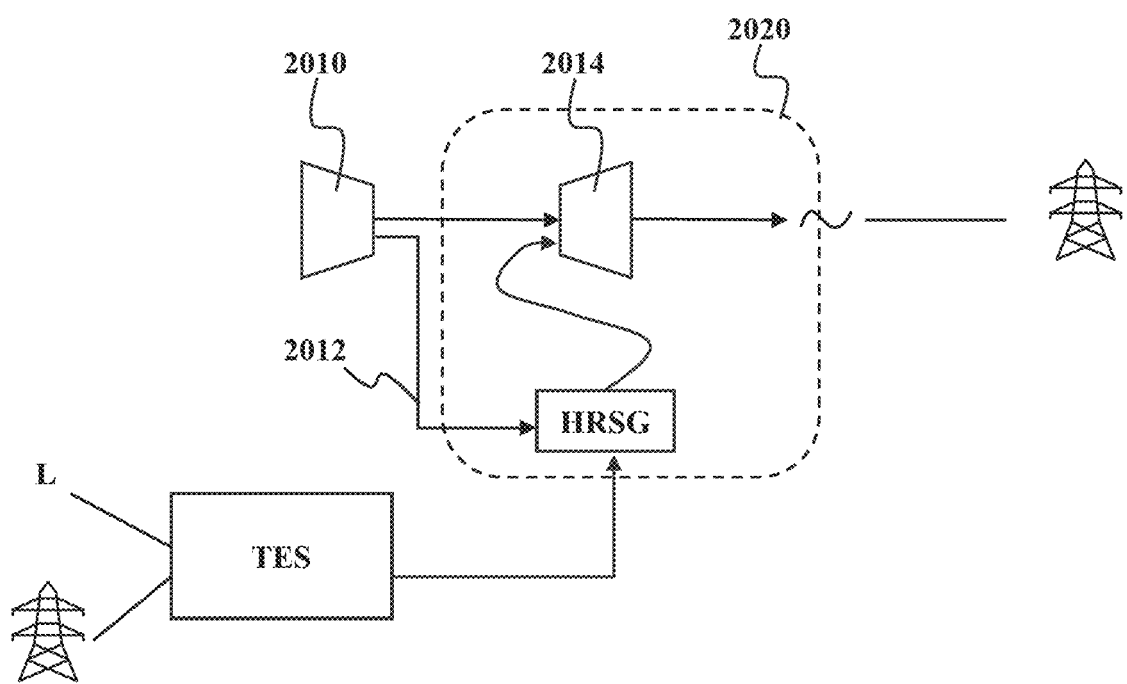
FIG. 20 illustrates a schematic diagram of a system according to the example implementations.

FIG. 20 illustrates a combined cycle plant, with a gas turbine 2010 whose exhaust 2012 is provided an HRSG, which powers a steam turbine 2014. The gas turbine 2010 and steam turbine 2014 work together to drive a shaft of a generator. In some configurations the output turns one shaft, while in others the output is directed to two shafts, with each output driving its own shaft. A conventional combination 2020 of a steam turbine and a boiler typically requires a warm-up time of one to two hours, with the gas turbine 2010 requiring a warm-up time of 10 to 30 minutes. If the combined cycle plant 2020 is to participate in the evening energy demand ramp 1920, then the plant operator must begin startup one or two hours prior to the increase in demand (as indicated by dotted line 1930 in FIG. 19). The operator of this traditional power plant must light up the gas turbine 2010 to warm the HRSG and steam turbine 2014, so that the combined cycle plant is ready to run during the time of the evening ramp 1920. For this one- to two-hour period in anticipation of the energy demand ramp, the combined cycle plant is burning fuel, warming up the plant and creating spinning reserve, but with zero resultant revenue.

To resolve this disadvantage of conventional systems, a TES unit can be added to a traditional power plant to heat the HRSG, as shown in FIG. 20. With this configuration, the TES can store energy during the low price period of the day. The TES can charge from the grid during low (including negative) price periods, and can be used warm up the HRSG and the steam turbine. With a TES unit providing steam for powering this turbine alongside a boiler, this results in a hybrid combined cycle gas turbine HRSG.

Based on the discussions above, there are now at least three different optional sources of non-renewable steam as shown in FIG. 14: (1) a combined cycle gas turbine (CCGT); (2) a nuclear power plant; and (3) a coal-fired boiler. Other conventional sources can be used. The TES unit can be configured to provide this warm-up service to the overall power plant and to provide rapid responsiveness to changes in electrical demand. Sequentially, in one embodiment, the system may charge the TES during low price periods, warm the steam turbine in preparation for the evening ramp, fire the gas turbine, and continue charging during this entire time. Thus, the TES can warm up the various component as described, and can ramp up the overall plant output while stopping the charging of the TES. The rapid responsiveness can be achieved by both (a) redirecting electricity used to charge the TES back to the grid and/or (b) using energy from the TES to heat steam that is added to a steam turbine powered by the power plant, increasing any electricity generated from the turbine output. In one embodiment, the system keeps charging until electricity price is above the gas or coal price, where one can combine this rapid responsiveness to provide peak power output during particular price spikes where the system uses more TES steam to increase the overall plant output.

Figure 21:
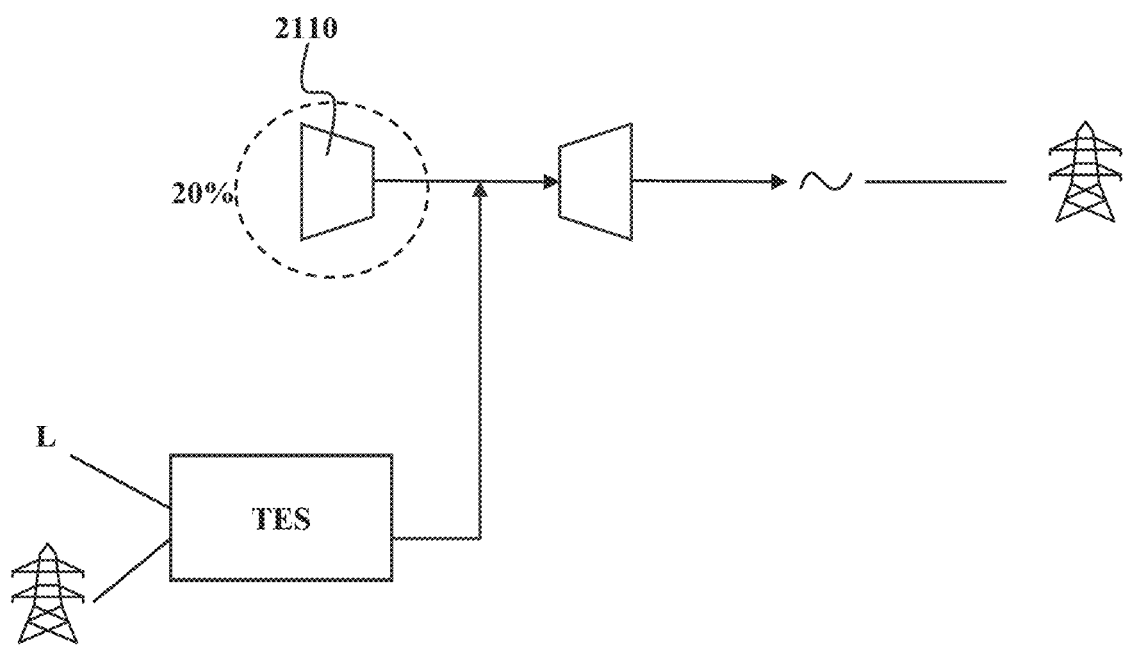
FIG. 21 illustrates a schematic diagram of a system according to the example implementations.

Referring now to FIG. 21, in some embodiments, the same power plant with a TES unit is essentially running as a thermal energy storage power plant with a gas peaker such as a gas turbine 2110 that might only run 20% of the year. Although this percentage may vary, the concept in this particular embodiment is that the power plant runs the gas peaker only a minority of the time, decreasing system reliance on using fossil fuels and also decreasing operating costs. More of the uptime of the power plant uses output from the TES, and the gas peaker can therefore be operated only when excess electricity is needed, i.e. beyond what the TES provides. Such a system can be configured to be upgraded in phases: initially, one installs a TES unit of smaller capacity that is just enough to keep the overall power plant warmed up to address any ramp up or ramp down demands; and then, later on, a TES of greater capacity can be added, or more TES units can be installed together, such that the power plant provides more electricity generated by the TES and less by gas peaker consuming fossil fuel.

This matter of providing the pre-warm up and spinning reserve is one way of deploying TES units into existing power plants, instead of waiting for entire power plants to be decommissioned for replacement by new power plants. This results in a significant reduction in costs of existing plant operations by avoiding the consumption fuel to meet the evening ramp up and also by being able to quickly respond to sudden increases or decreases in power demand by using systems more responsive than traditional boilers. This allows for the TES units to be deployed in a manner that integrates with existing power plants to improve efficiency and reduce operating costs.

Examples of Power Plant Systems Combined with A TES Unit

Figure 22:
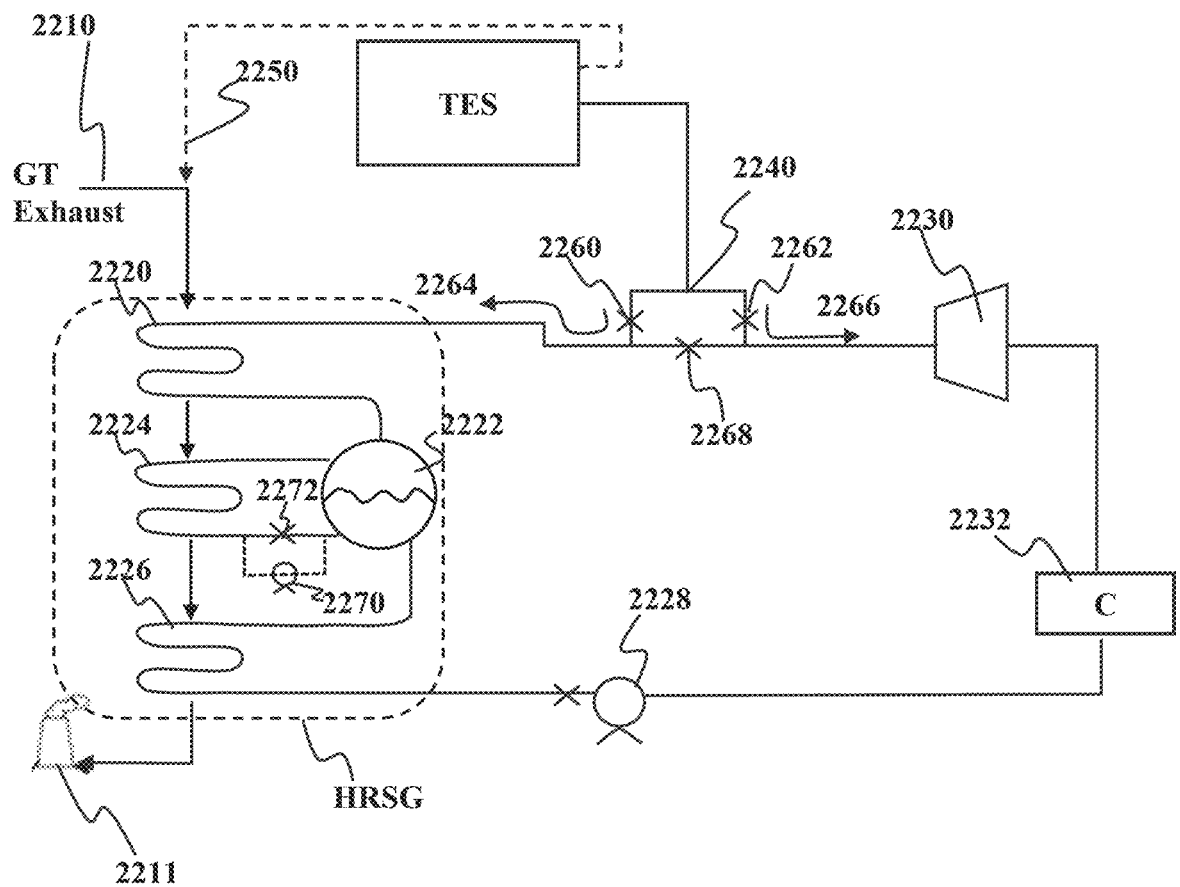
FIG. 22 illustrates a schematic diagram of a system according to the example implementations.

Referring now to FIG. 22, an HRSG boiler receives heat from a gas turbine (not shown). A gas turbine exhaust 2210 flows over a bundle of tubes of a superheater 2220. Those tubes are receiving steam from the drum 2222, and another set of tubes of an evaporator 2224 receive liquid and boil it. The evaporator produces saturated steam and the superheater produces superheated steam from the saturated steam. Water is provided to going into a drum 2222, and an economizer 2226 and a feed water pump 2228 are provided as shown. The resultant superheated steam is provided to a steam turbine 2230 and then to a condenser 2232 and back to the pump 2228.

A superheated steam header 2240 and a TES unit with a steam generator (not separately shown) which is also producing superheated steam are connected into the steam header 2240, so that it can run the steam turbine 2230. This system provides for keeping the turbine 2230, the drum 2222 and the tubing hot. Keeping the tubing hot is advantageous, because the drum 2222 is a large heavy metal object that expands slowly. Keeping the turbine 2230 hot is also advantageous; for example, if the turbine 2230 is heated too fast, the blades of the turbine will touch the casing, causing damage. This is because the outer casing of a turbine 2230 has a very small gap between the blades and the casing, in order to not allow too much steam leakage past the blades. The turbine 2230 should not be allowed to heat rapidly because the turbine blades will expand faster than the casing and drag against the outer casing, damaging or destroying the casing. Accordingly, keeping the turbine 2230 at or near an operative temperature is highly desirable.

In FIG. 22, air or other fluid 2250 from the TES can be pushed or combined with the gas turbine exhaust 2210. One could be moving super-heated air into the same pathways as the gas turbine exhaust. This can result in low efficiency because that air may ultimately exit an exhaust stack 2211. Combustion products in traditional systems are exhausted to the ambient environment.

Another way to maintain temperature control is through the use of control valves such as flow control valves 2260 and 2262, with flow going both ways as indicated by arrows 2264 and 2266. There may be a further control valve 2268 to control forward and reverse flow in the system. In one embodiment, the flow 2264 heats the superheater 2220 and the drum 2222. The flow is counterclockwise from the point of view of the drawing. If the pump 2228 stops, absent a reverse flow valve high-pressure steam can flow through the turbine, but some of it comes backwards through the boiler, where it warms up the components. To warm up the tubes of evaporator 2224, there may optionally be a pump 2270 and a check valve 2272 so one can add circulation on the evaporator 2224.

Optionally, the technique may include the following steps: (a) level sense the drum; (b) circulate pump in the evaporator tubes; and (c) adjust flow at 2272 so that there is reflux flow. This technique allows for heating the boiler with the reverse steam flow. Optionally, the system can also run and heat the turbine with forward steam flow. Optionally, one can do both at the same time, or in some selected sequence.

In one embodiment, the sequence may be to use the TES unit to warm up the various components 2220-2226, while the TES runs the turbine 2230, keeping it warm. Optionally, the TES can also power the turbine by itself to full turbine capacity. The system can also be configured to warm up the HRSG with reverse steam: in this case, the gas turbine heats the HRSG, and a sequence of steps is provided for combining with the TES unit output where the process goes from the steps of: (1) TES plus steam turbine (spinning reserve); to (2) TES plus steam turbine plus HRSG (preparation for full power ramp and warm up the boiler); to (3) TES plus GT plus steam turbine plus HRSG (transition into full power); and finally to (4) the gas turbine plus the steam turbine and the HRSG, in some desired operating sequence. The sequence can progress all the way back down the other way from step (4) back to step (1). This operating state of GT plus TES may include all of this, providing regulation up or down and capture negative prices.

A combined cycle power plant operator might not want to generate electricity when prices are below some threshold, so with a TES unit, the operator can convert that electricity to thermal energy, stored for later use.

This thermal energy storage is unlike any other kind of electricity storage: lithium-ion battery storage and other storage systems do not solve the above problems of warming up a thermal power plant. Traditional power plants were designed to generate into positive power prices, but current renewable energy sources result in there are periods of low or zero prices. The embodiments described herein avoid the wastage of energy and higher costs of such situations.

Figure 23:
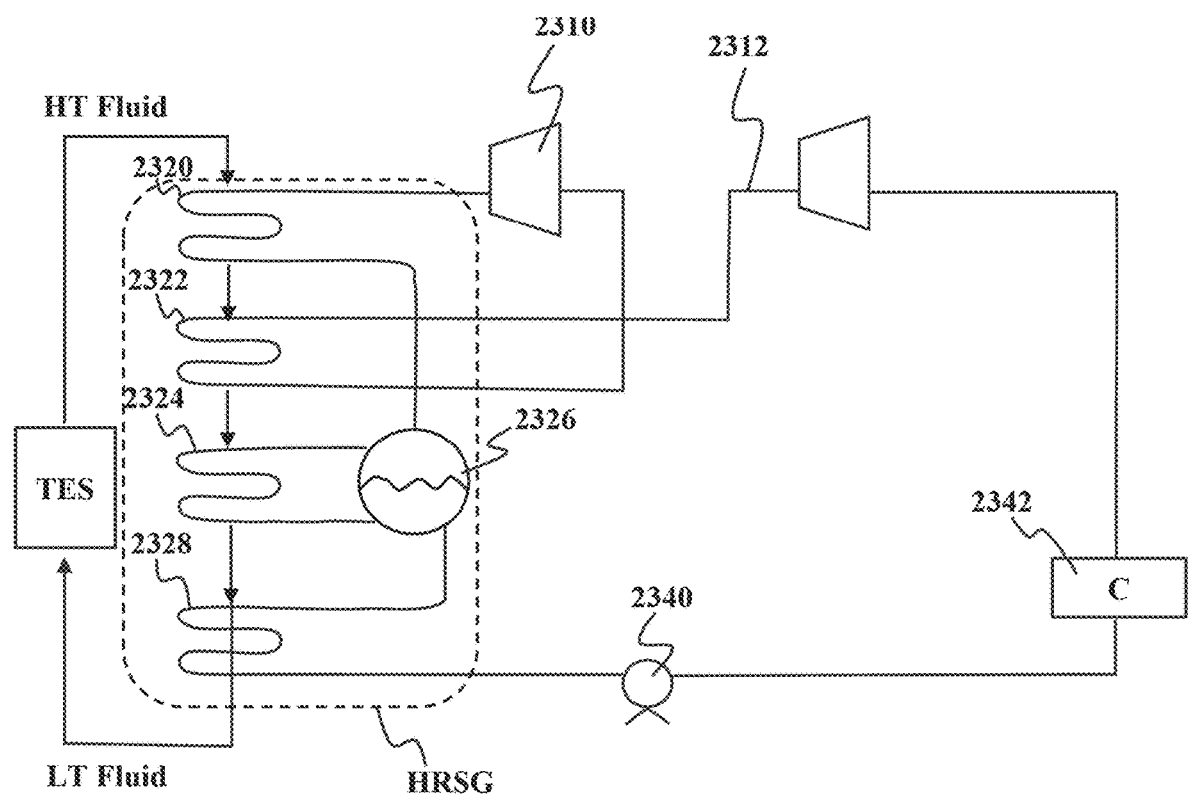
FIG. 23 illustrates a schematic diagram of a system according to the example implementations.

Referring now to FIG. 23, a system is shown with a turbine 2310 and a reheat stage. There is a superheater heat exchanger 2320, a reheater heat exchanger 2322, and an evaporator heat exchanger 2324 with a drum 2326. There is also an economizer heat exchanger 2328 coming into the system from the boiler feed water pump 2340 coupled to the condenser 2342. FIG. 23 shows a high-temperature working fluid and a low-temperature working fluid. The system can use a TES with the HRSG. A high-pressure superheater heat exchanger 2320 provides steam at a pressure such as about 100 bar. The intermediate pressure of reheater heat exchanger 2322 may be about 14 to 16 bar in a typical coal-fired power plant. The temperature may be about 600° C. for the superheater heat exchanger 2320 output and the reheater heat exchanger 2322 may also provide steam at about 600° C. The steam is reheated; it is at a much lower temperature upon exiting a first turbine or first turbine stage 2310, and is reheated and has much more exergy available again, proceeding at a pressure of about 14 to 16 bars at a second turbine 2350. With the reheater heat exchanger 2322, more turbine stages can be used for deriving more work from the steam. Without the reheat, the second turbine does not have as many stages. In this example, a single HRSG in the thermal storage system TES is described.

Referring now to FIG. 24, one variant of the configuration of FIG. 23 is to include a heat transfer fluid (HTF) heat exchanger 2422 in place of or in addition to the existing heat exchangers in the system. FIG. 24 shows a system with a turbine 2410, a superheater heat exchanger 2420, a heat transfer fluid heat exchanger 2422, an evaporator heat exchanger 2424 with the drum 2426. There is also an economizer heat exchanger 2428 receiving output from the boiler feed water pump 2340 coupled to the condenser 2342. The system can use a TES with the HRSG. The HTF may be but is not limited to a thermal oil, bisphenol, and/or other oils for industrial heat transfer processes. The HTF in some embodiments may be in the range of about 25° C. to around 400° C. For the HTF loop, the incoming HTF may be at 190° C. and exit at about 390° C. In some embodiments, the incoming HTF to the HTF heat exchanger 2422 may be above about 200° C., optionally above about 250° C. In some embodiments, the incoming HTF may be at about 300° C. and go out at about 390° C.

Thermal oils do not have high vapor pressure, so in this case, thin wall tubing is used at these temperatures. In some embodiments, a low return temperature of the liquid is desirable so that there is a low gas temperature going back to the TES. By integrating steam plus HTF in one HRSG, a heat exchanger cascade can provide a desired output temperature of the gas going back to the TES unit. With a power cycle steam generator, the tubing bundles for the heat exchangers are set in such a way that the hottest air and the HTF heat exchanger 2422 can be the first to receive heat, or the superheater 2420 might be first. As seen in FIG. 24, there is a mix of steam tubing bundles and HTF tubing bundles in a single heat path. The working fluid flowing over the tubing bundles for the heat exchangers can be air, nitrogen, carbon dioxide, molten salt, or combinations thereof. The working fluid may be a gas or liquid.

FIG. 23 shows a dual-pressure reheat HRSG with a TES. FIG. 24 shows a dual-purpose HTF plus steam HRSG with a TES. FIG. 23 shows a dual-pressure design suitable for repowering existing plants, such as a coal plant or other conventional plant. Embodiments using a reheater alone with a TES will, for otherwise conventional systems, bring the working fluid temperature down to about 350-370° C., which is hotter than normally practical for recirculation. In the cascade configurations shown in FIGS. 23 and 24, the temperature can be brought down to a desirable range in a single pass due to the multiple heat exchangers. For example, some of the working fluid's energy is used for superheating the first stream heat exchanger, and some of it is used for re-superheating the second superheater or for heating the heat transfer fluid for embodiments like those of FIG. 24. After passing through the cascade, the working fluid is doing evaporation work at lower temperatures, and the economizer works at still lower temperatures. Thus, for HT fluid, the incoming temperature can be, e.g., about 700° C. and can exit at about 150-200° C. for return LT fluid to the TES. The cascade brings this otherwise too-hot air into a return temperature range suitable for the TES to process.

In some embodiments, an enclosure contains both the TES and the heat exchangers of FIG. 23 or 24. A backwards steam flow allows for a sealed TES enclosure, allowing a steam pipe can transfer more energy over a longer distance as compared to air or gas that uses a very short duct, since air or gas cannot transfer as much energy over longer distances.

Summary of Claim Areas for Inventive Embodiments

A system and method of improving power plant efficiency that involves using a fuel-powered power plant and a boiler with a thermal energy storage unit in combination, allowing the fuel-powered power plant to run its turbine at maximum efficiency, while the thermal energy storage unit is used to provide additional energy during a request to send more power to the electrical grid or to act as an energy sink or storage during a request to send less power to the electrical grid. This reduces maintenance costs for the boiler of the fuel-powered power plant, as ramping up or ramping down is performed by the thermal energy storage unit, not the boiler for the fuel-powered power plant. This also improves the responsiveness of the power plant as the thermal energy storage unit can more quickly increase its steam output than a traditional boiler.

A system and method of decreasing fuel usage in a fuel-fired power plant and a boiler with a thermal energy storage system that involves warming up various components of the fuel-power power plant by using the boiler of the thermal energy storage system, which reduces overall fuel usage because fuel-fired equipment is not used to perform the warming-up. In addition to reducing fuel costs, this also reduces overall power plants costs as the thermal energy storage system is charged when electricity costs are low and discharged when electricity costs are higher.

A system and method of warming up components of a fuel-powered power plant with a thermal energy storage system that involves using a steam header with flow control valves and/or pumps to direct reverse steam flow through the fuel-powered power plant to warm up components of the power plant or to keep existing equipment at or near an operating temperature.

A system and method for preventing a scram shutdown of a nuclear reactor power plant that involves directing all power generated by the nuclear reactor power plant to a thermal energy storage system that functions as an energy sink and/or discharge to absorb some or all of the excess power from the nuclear reactor power plant, allowing time for the nuclear reactor to be shut down under normal conditions instead of scram conditions or to continue operating while the even that caused the need for a shutdown (such as a power grid going down) is rectified.

A system and method for preventing a scram shutdown of a nuclear reactor power plant that involves charging a thermal energy system at its maximum charge rate during the emergency by opening one or more discharge ports on the thermal energy system, thus allowing venting of heat from the thermal energy storage system and ensuring that the maximum charge rate is available at all times for absorbing the excess power from the nuclear reactor power plant.

A system and method of combining a thermal energy storage system with an existing power plant that involves using a cascade of heat exchangers arranged to extract heat from working fluid that is heated by the thermal energy storage system, where the heat extraction is sufficient so that the return temperature of working fluid back to the thermal energy storage system is at a temperature within a predetermined, usable input temperature range. The cascade of heat exchangers can be used to heat a first turbine stage and then reheat steam output to be input into a second turbine stage at a lower pressure.

A system and method of combining a thermal energy storage system with an existing power plant that involves using a cascade of heat exchangers arranged to extract heat from working fluid that is heated by the thermal energy storage system, where the heat extraction is sufficient so that the return temperature of working fluid back to the thermal energy storage system is at a temperature within a predetermined, usable input temperature range, wherein one heat exchanger superheats steam and where another heat exchanger heats a heat transfer fluid such as a thermal oil for another industrial use.

Claim 1: A steam system for powering an industrial load including:
  a plurality of boilers, each including:
    a thermal energy storage (TES) unit configured to store thermal energy in a storage medium;
    a first heat exchanger configured to receive thermal energy from the TES unit;
    a second heat exchanger configured to receive thermal energy from the TES unit;
    a first steam flow header configured to provide fluid communication between the first heat exchangers of the boilers and the industrial load, said first steam flow header configured to provide a first combined steam output at a first temperature and a first pressure to the industrial load; a second steam flow header configured to provide fluid communication between the second heat exchangers of the boilers and the industrial load, said second steam flow header configured to provide a second combined steam output at a second temperature lower than the first temperature and at a second pressure lower than the first pressure; and a control system configured to adjust each of the boilers to provide the first combined steam output pressure to be in a target industrial load steam pressure range and the second combined steam output pressure to be in a second target industrial load steam pressure range.

Claim 2: The system of claim 1 wherein the TES units include two or more TES units connected in parallel by the steam headers, wherein at least one of the parallel TES units is configured to be shut down for periodic maintenance while a remainder of the TES units remain operational, and wherein the first steam header is configured to provide steam to a steam turbine electricity generator for continuous electricity generation.

Claim 3: The system of claim 1 further including a fluid movement system for directing a working fluid heated by the TES unit over the heat exchangers.

Claim 4: The system of claim 3 wherein the working fluid is salt.

Claim 5: The system of claim 3 wherein the working fluid is air, carbon dioxide, nitrogen, or a combination thereof.

Claim 6: The system of claim 3 wherein the working fluid is heated by the TES unit to a temperature between about 1000° C. to 600° C.

Claim 7: The system of claim 3, where the storage medium is configured to radiate thermal energy to heat the working fluid.

Claim 8: The system of claim 1 further including an evaporator in each of the boilers that is in fluid communication with the second heat exchanger.

Claim 9: The system of claim 8 further including an economizer in each of the boilers that is in fluid communication with the evaporator.

Claim: 10: The system of claim 1 further including a fossil fuel fired boiler configured to provide steam at the first pressure and the first temperature.

Claim 11: The system of claim 1 further including a fossil fuel fired boiler configured to provide steam at the second pressure and the second temperature.

Claim 12: The system of claim 1 wherein the storage medium includes a plurality of thermal storage blocks.

Claim 13: The system of claim 1 wherein the storage medium contains one or more radiation cavities.

Claim 14: The system of claim 1 further including one or more electric heaters in the TES unit for directing thermal energy to the storage medium.

Claim 15: The system of claim 14 wherein the electric heaters are powered by an energy source having intermittent availability.

Claim 16: The system of claim 1 wherein the industrial load is a steam turbine.

Claim 17: The system of claim 16 wherein the first heat exchanger provides steam to a first section of the steam turbine.

Claim 18: The system of claim 16 wherein the second heat exchanger provides steam to a second section of the steam turbine.

Claim 19: The system of claim 16 wherein the steam turbine includes a steam extraction in a closed configuration.

Claim 20: The system of claim 3, wherein the fluid movement system is configured as a closed-loop system configured to emit no greenhouse gases or pollution to an outside environment where humans live.

Claim 21: A method for powering an industrial load including:
  storing thermal energy in a storage medium of a thermal energy storage (TES) unit of a first boiler;
  receiving thermal energy from the TES unit in a first heat exchanger of the first boiler;
  receiving thermal energy from the TES unit in a second heat exchanger of the first boiler;
  delivering steam from the first heat exchanger of the first boiler to the industrial load at a first temperature and a first pressure;
  delivering steam from the second heat exchanger of the first boiler to the industrial load at a second temperature lower than the first temperature and at a second pressure lower than the first pressure; and
  using a controller to adjust the first boiler such that the first pressure is in a first target pressure range and the second pressure is in a second target steam pressure range.

Claim 22: The method of claim 21 further including directing a working fluid heated by the TES unit over the heat exchangers.

Claim 23: The method of claim 22 wherein the working fluid is salt.

The method of claim 44 wherein the working fluid is air, carbon dioxide, nitrogen, or a combination thereof.

Claim 24: The method of claim 22 wherein the working fluid is heated by the TES unit to a temperature between about 1000° C. to 600° C.

Claim 25: The method of claim 24 further including redirecting the working fluid back to the TES to be heated again after the working has passed over all of the heat exchangers.

Claim 26: The method of claim 25 further including radiating thermal energy from the storage medium to heat the working fluid.

Claim 27: The method of claim 21 wherein delivering steam further includes using a fossil fuel fired boiler to provide steam at the first pressure and the first temperature.

Claim 28: The method of claim 21 wherein delivering steam further includes using a fossil fuel fired boiler to provide steam at the second pressure and the second temperature.

Claim 29: The method of claim 28 wherein the storage medium contains one or more radiation cavities for radiating thermal energy.

Claim 30: A method for powering a steam turbine including:
  storing thermal energy in a storage medium of a thermal energy storage (TES) unit of a first boiler;
  receiving thermal energy from the TES unit in a first heat exchanger of the first boiler;
  receiving thermal energy from the TES unit in a second heat exchanger of the first boiler;
  closing a steam extraction on the steam turbine;
  delivering steam from the first heat exchanger to a first section of the steam turbine at a first temperature and a first pressure;
  delivering steam from the second heat exchanger to a second section of the steam turbine at a second temperature lower than the first temperature and at a second pressure lower than the first pressure; and using a controller to adjust the first boiler such that the first pressure is in a first target pressure range and the second pressure is in a second target steam pressure range.

Claim 31: A method for powering an industrial load including:
providing a plurality of boilers, each with a thermal energy storage (TES) unit,
storing thermal energy in a storage medium of the TES unit;
receiving thermal energy from the TES unit in a first heat exchanger of each of the boilers;
receiving thermal energy from the TES unit in a second heat exchanger of each of the boilers;
combining steam from the first heat exchanger of the boilers and delivering to the industrial load at a first temperature and a first pressure;
combining steam from the second heat exchanger of the boiler and delivering to the industrial load at a second temperature lower than the first temperature and at a second pressure lower than the first pressure; and
using a controller to adjust the boilers such that the first pressure is in a first target pressure range and the second pressure is in a second target steam pressure range.

Claim 32: The system of claim 3, wherein the fluid movement system is configured as a closed-loop system configured to emit no greenhouse gases or pollution to an outside environment where humans live.

Further Inventive Aspects Relating to Copper Production

The following description and FIGS. 25-29 are directed to applicant's inventive developments relating to thermally accelerated hydrometallurgical production of copper from mixed oxide/sulfide ores, secondary sulfide ores, and primary sulfide ores.

The transition to renewable sources of energy from wind and solar power globally requires the production of much more copper and other nonferrous metals. The sustainability of production processes, the ability to exploit smaller ore bodies, and the ability to produce from lower-grade ores all drive the need for processes that can produce metals with lower environmental impact, lower cost, and speed and scale. Accordingly, it is valuable to have processes powered by renewable energy, using means and methods that are economical and practical.

One important hydrometallurgical process which is a candidate for being powered by renewable energy is the production of copper by leaching, where the leaching is carried out at an elevated temperature, for example above 50° C., so as to enable chemical reactions that are not favored at lower temperatures, including the breakdown of sulfur passivation layers which otherwise block effective yield in hydrometallurgical processing of secondary and primary sulfides. Elevated temperatures may also speed the production and improve the yield in leaching oxide ores.

The present innovation offers a low-cost, practical means of supporting the production of copper in thermally accelerated leaching, in both closed vessel and open heap leaching operations. A heap leach operation as in FIG. 25 may involve the construction of a leach pile, which may for example extend ten or more meters high, 30 or more meters wide, and 100 or more meters in length. Beneath the pile an impervious layer and collection piping collect pregnant leachate solution, from which copper ions are extracted and then reduced to metal in an extraction/electrowinning process.

Figure 25:
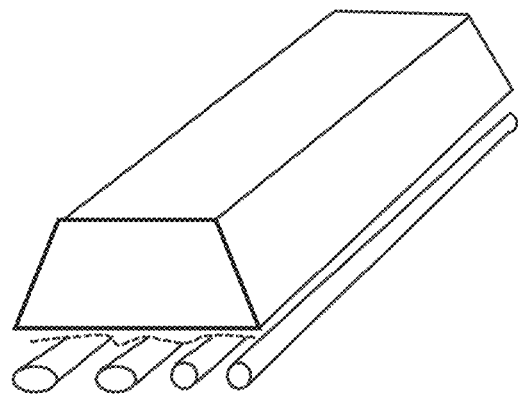
FIGS. 25-29 are directed to applicant's inventive developments relating to thermally accelerated hydrometallurgical production of copper from mixed oxide/sulfide ores, secondary sulfide ores, and primary sulfide ores.
Figure 26:
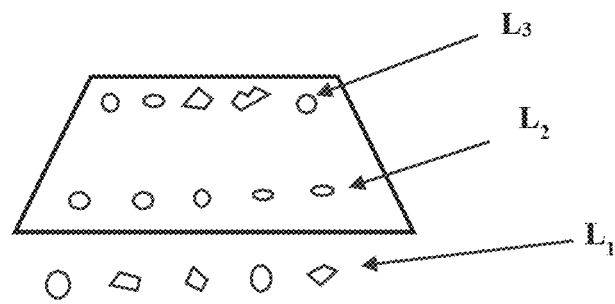
Figure 27:
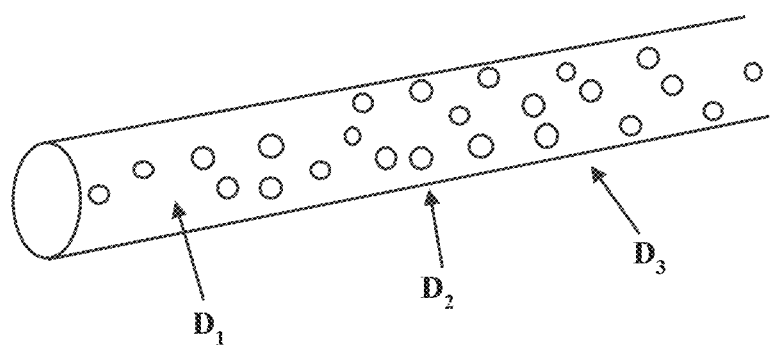

Thermally accelerated leaching operation processes include those that rely on the supply of heat from an external source into the pile, and those where microbes metabolize oxygen and iron in pyrite or other minerals within the pile and release metabolic heat to heat the pile, so as achieve the temperatures that enable such leaching of sulfides. All such processes, whether driven by externally supplied heat or heated microbiologically or a combination, require the introduction of some combination of air or other gases, including steam, in a relatively uniform manner across a large heap area, and/or in each lift of a multistage leach. FIG. 25 shows piping that may collect leachate, and or may supply a flow of gas into the pile. FIG. 26 shows that one or a plurality of groups of piping may enable liquid collection, for example at level L1, or gas introduction at one or more levels L1, L2 and L3, so as to maintain gas flow and temperature conditions. Piping embedded within a pile such as L2 may carry away excess internally generated heat, and in combination with other piping may redistribute internally generated heat to, for example, outer regions of a pile so as to maintain a more uniform temperature profile.

The supply of a relatively uniform gas flow across the length of the pile from pipes whose gas entry is at one end may be achieved by distributing perforations in pipes, or adjusting their diameter in a manner that varies along the length of the pipe, so as to accommodate variations in fluid pressure within the pipe, which will be higher near the gas entry end and lower at the distal end of the pipe, with a relatively smaller number of perforations or other flow restriction devices at the proximal (upstream, gas entry) end, and of relatively larger open area or less restricted flow at the farther end, so as to achieve a relatively uniform flow of air along the length of the pipe into the pile. Flow may be proportioned across a set of parallel pipes, for example the pipes at L1, by use of one or more flow restriction devices such as orifice plates or chokes, so as to achieve a relatively uniform flow into each of a set of parallel pipes. Flow into such pipes may be a mixture of ambient air, low pressure steam, heated air, or another gas.

Figure 28:
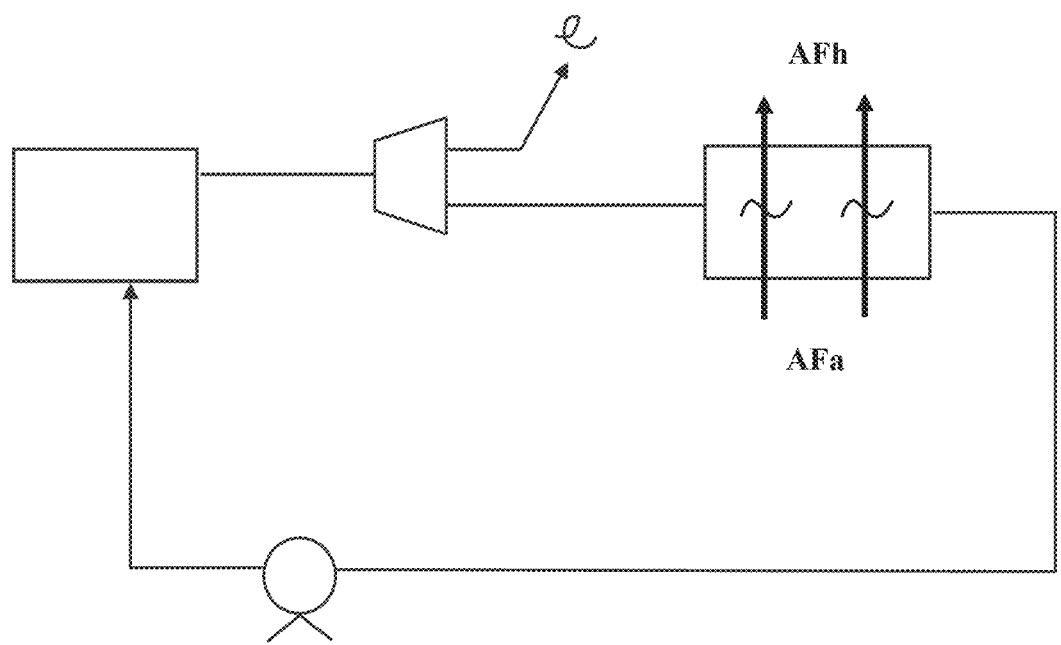

The present innovation includes such means and methods for distributing energy and gas through the above-mentioned piping, as well as means for providing a supply of heated air and/or steam into such piping. FIG. 28 shows a system that includes a thermal storage unit delivering steam driving a steam turbine which is providing electric power, wherein outlet steam from the turbine is cooled by an air cooled condenser which brings in ambient air labeled AFa across heat exchangers that cool the steam flow and raise the air temperature, with the heated air AFh expelled by fans or blowers within that condenser. Instead of releasing such heat simply to the ambient environment as in a conventional Rankine cycle power generation, in the invention such air is directed to flow into pipes that extend into a leach heap or a leach vessel and provide a supply of either (a) heated air to power microbiological leach processes, or (b) heated air and/or gas to power chloride leach or other heat-reliant leach processes. Because thermal energy from the thermal storage unit powers either electrical generation through the turbine or heat delivered into the pile, the combined efficiency of the use of input intermittent electricity to the thermal storage unit is high, for example exceeding 90%.

Figure 29:
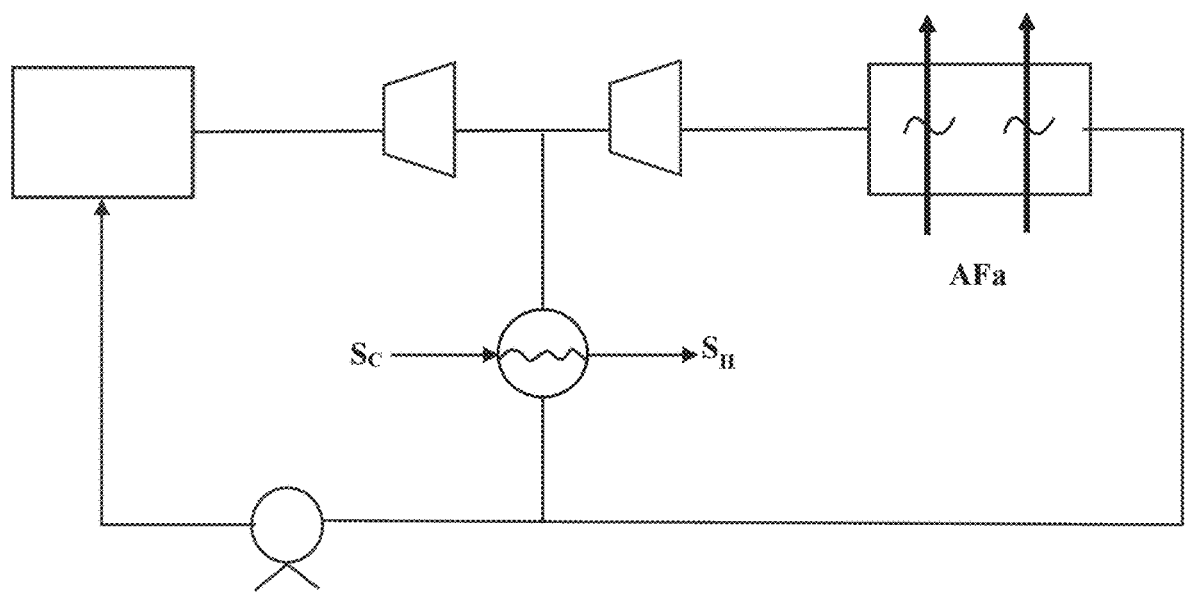

FIG. 29 depicts further innovations including the use of a multistage extraction turbine, where some of the energy in the form of steam coming from the thermal storage unit is used for a second purpose, and some of the energy is used for the aforementioned heat delivery into the leach process. Such second unit may heat the SX-EW (solvent extraction and electrowinning) fluid via a heat exchanger. In both process configurations, the electricity delivered by the turbine may power blowers, pumps, electric vehicle charging, electrowinning, or other loads associated with mine operations. The cogeneration of electricity, medium-temperature heat for solution heating, and/or low-temperature heat for leach process heating can be accomplished at exceptional efficiency and low cost with a suitably configured thermal storage unit and thermal and steam turbine.

Such a facility may be operated during a first period of its life to power a mine operation as described, and during a second period of its life as a pure thermal storage power station facility, where an air-cooled condenser may discharge heat to ambient when mining operations no longer require the use of such heat. As such, a renewable energy-plus-storage-plus-power generation asset built initially to power a mining operation may become a valuable portion of an electricity grid in periods when the mining operation is not under way.

Terminology

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:
A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic or other composition that can generate heat.

The terms air, fluid and gas are used interchangeably herein to refer to a fluid heat transfer medium of any suitable type, including various types of gases (air, $CO_2$, oxygen and other gases, alone or in combination), and when one is mentioned, it should be understood that the others can equally well be used. Thus, for example, "air" can be any suitable fluid or gas or combinations of fluids or gases.

While foregoing example implementations may refer to "air", the inventive concept is not limited to this composition, and other fluid streams may be substituted therefor for additional industrial applications, such as but not limited to, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the necessary properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. A steam system for powering an industrial load including:
   a first thermal energy storage (TES) unit including:
      a first assemblage of thermal storage blocks formed from a storage medium configured to store thermal energy in the storage medium;
      a first set of electrical heating elements removably mounted within the first assemblage, wherein the first set of electrical heating elements is configured to convert electricity into heat and to provide the heat to the thermal storage blocks;
      a first heat exchanger configured to receive thermal energy from the first assemblage of thermal storage blocks; and
      a second heat exchanger configured to receive thermal energy from the thermal storage blocks;
   a second TES unit including:
      a second assemblage of thermal storage blocks formed from the storage medium configured to store thermal energy in the storage medium;
      a second set of electrical heating elements removably mounted within the second assemblage, wherein the second set of electrical heating elements is configured to convert electricity into heat and to provide the heat to the thermal storage blocks;
      a third heat exchanger configured to receive thermal energy from the second assemblage of thermal storage blocks; and
      a fourth heat exchanger configured to receive thermal energy from the second assemblage of thermal storage blocks;
   a first steam circuit configured to provide fluid communication between the first heat exchanger, the third heat exchanger, and the industrial load, said first heat exchanger and/or the third heat exchanger configured to provide steam to the industrial load at a first temperature and a first pressure;
   a second steam circuit configured to provide fluid communication between the second heat exchanger, the fourth heat exchanger, and the industrial load, said second heat exchanger and/or fourth heat exchanger configured to provide steam to the industrial load at a second temperature lower than the first temperature and at a second pressure lower than the first pressure; and
   a control system configured to adjust the TES units such that the first pressure is in a first target pressure range and the second pressure is in a second target steam pressure range;
   wherein the control system is configured to match a combined steam output pressure of the TES units to a predetermined steam outlet pressure.

2. The system of claim 1 wherein the first TES unit further includes a fluid movement system for directing a working fluid heated by the thermal storage blocks over the first heat exchanger and the second heat exchanger.

3. The system of claim 2 wherein the working fluid is air, carbon dioxide, nitrogen, or a combination thereof.

4. The system of claim 2 wherein the working fluid is heated by the thermal storage blocks to a temperature between about 600° C. to 1000° C.

5. The system of claim 2, where the storage medium is configured to radiate thermal energy to heat the working fluid.

6. The system of claim 1 further including an evaporator in the first TES unit that is in fluid communication with the second heat exchanger.

7. The system of claim 6 further including an economizer in each of the TES units that is in fluid communication with the evaporator.

8. The system of claim 1 further including a fossil fuel fired boiler configured to provide steam at the first pressure and the first temperature.

9. The system of claim 8 further including a steam flow header in the first steam circuit for fluid communication between the first heat exchanger, the third heat exchanger, the fossil fuel fired boiler, and the industrial load.

10. The system of claim 1 further including a fossil fuel fired boiler configured to provide steam at the second pressure and the second temperature.

11. The system of claim 9 further including a steam flow header in the second steam circuit for fluid communication between the second heat exchanger, the fourth heat exchanger, the fossil fuel fired boiler, and the industrial load.

12. The system of claim 1 wherein the first TES unit further includes a heat extraction system including the first heat exchanger and the second heat exchanger for returning a working fluid to the thermal storage blocks at a temperature within a predetermined, input temperature range below a threshold temperature.

13. The system of claim 1 wherein the thermal storage blocks contain one contain one or more radiation cavities.

14. The system of claim 1, wherein the first set of electrical heating elements is powered by an energy source having intermittent availability.

15. The system of claim 1 wherein the industrial load is a steam turbine.

16. The system of claim 15 wherein the first heat exchanger and/or third heat exchanger provides steam to a first section of the steam turbine.

17. The system of claim 15 wherein the second heat exchanger and/or fourth heat exchanger provides steam to a second section of the steam turbine.

18. The system of claim 15 wherein the steam turbine includes a steam extraction in a closed configuration.

19. The system of claim 1 wherein the first heat exchanger, the third heat exchanger, and the industrial load are in fluid communication in a parallel configuration wherein the TES units are thereby configured to provide steam independently of one another.

20. The system of claim 1 wherein the second heat exchanger, the fourth heat exchanger, and the industrial load are in fluid communication in a series configuration wherein the TES units are thereby configured to provide combined steam to the industrial load.

* * * * *